United States Patent
Zhao et al.

(10) Patent No.: US 7,715,659 B2
(45) Date of Patent: May 11, 2010

(54) APPARATUS FOR AND METHOD OF FEATURE EXTRACTION FOR IMAGE RECOGNITION

(75) Inventors: Jiali Zhao, Beijing (CN); Dejun Wang, Beijing (CN); Haibing Ren, Beijing (CN); Seokcheol Kee, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1675 days.

(21) Appl. No.: 10/893,346

(22) Filed: Jul. 19, 2004

(65) Prior Publication Data

US 2006/0008150 A1 Jan. 12, 2006

(30) Foreign Application Priority Data

Jul. 7, 2004 (KR) .................... 10-2004-0052643

(51) Int. Cl.
*G06K 9/54* (2006.01)
(52) U.S. Cl. .................. 382/305; 382/118; 382/209; 382/278
(58) Field of Classification Search .............. 382/118, 382/209, 219, 278, 305
See application file for complete search history.

(56) References Cited

U.S. PATENT DOCUMENTS

| | | | | |
|---|---|---|---|---|
| 5,496,669 | A * | 3/1996 | Pforr et al. ..................... | 430/22 |
| 5,602,896 | A * | 2/1997 | Diepstraten ................ | 378/98.7 |
| 5,896,092 | A * | 4/1999 | Bechtel ................ | 340/815.73 |
| 6,347,583 | B1 * | 2/2002 | Isogai et al. ................ | 101/126 |
| 6,421,629 | B1 * | 7/2002 | Ishiyama .................... | 702/159 |
| 6,433,824 | B1 * | 8/2002 | Tanaka et al. ............... | 348/345 |
| 6,492,633 | B2 * | 12/2002 | Nakazawa et al. .......... | 250/221 |
| 6,618,138 | B2 * | 9/2003 | Khoury ..................... | 356/302 |
| 6,628,406 | B1 * | 9/2003 | Kreuzer ...................... | 356/508 |
| 6,987,534 | B1 * | 1/2006 | Seta ........................ | 348/229.1 |
| 7,027,054 | B1 * | 4/2006 | Cheiky et al. ............... | 345/473 |
| 7,142,708 | B2 * | 11/2006 | Sakai et al. ................. | 382/149 |

OTHER PUBLICATIONS

D. Blackburn, M. Bone, and P. Phillips. Facial Recognition Vendor Test 2000: Evaluation Report, 2000.

P.J. Phillips, H. Moon, S. Rizvi, and P. Rauss. *The FERET Evaluation Methodology for Face Recognition Algorithms*: IEEE Trans. On PAMI, 22 (10): 1090-1103, 2000.

M. Turk and Pendland, *Face Recognition Using Eignefaces*.

(Continued)

*Primary Examiner*—Yosef Kassa

(57) ABSTRACT

An apparatus for and method of performing a most informative feature extraction (MIFE) method in which a facial image is separated into sub-regions, and each sub-region makes individual contribution for performing facial recognition. Specifically, each sub-region is subjected to a sub-region based adaptive gamma (SadaGamma) correction or sub-region based histogram equalization (SHE) in order to account for different illuminations and expressions. A set of reference images is also divided into sub-regions and subjected to the SadaGamma correction or SHE. A comparison is made between the each corrected sub-region and each corresponding sub-region of the reference images. Based upon the comparisons made individually for the sub-regions of the facial image, one of the stored reference images having the greatest correspondence is chosen. While usable individually, using the MIFE and/or SadaGamma correction or SHE together achieves a lower error ratio in face recognition under different expressions, illuminations and occlusions.

55 Claims, 20 Drawing Sheets

OTHER PUBLICATIONS

P.N. Belhumeru, J.P.. Hespanda and D.J. Kriegman, *Eignefaces vs. Fisherfaces: Recognition Using Class Specification Projection*, IEEE Trans PAMI, vol. 19, No. 7, 1997, pp. 711-720.

Xiaofei He, Shuicheng Yan, Yuxiao Hu, Hong-Jiang Zhang, *Learning a Locality Preserving Subpace for Visual Recognition*; ICCV 2004, pp. 385 - 392.

H. Sebastian Seung and Danial D. Lee, *The Manifold Ways of Perception*, Science, vol. 290, Dec. 22, 2000.

Joshua B. Tenebaum, Vin de Silva, and John C. Langford, *A Global Geometric Framework for Nonlinear Dimensional Reduction*, Science, vol. 290, Dec. 22, 2000.

Carrie Grimes and David Donoho, *Can These Things Really Work Theoretical Result for ISOMAP and LLE NIPS, 2002 Workshop*.

Comm 116 Lecture #15: Group Theories (http://ww.comm.cornell.edu/comm116/lec15.htm).

H. Chen, P. Belhumeur and D. Jacobs. *In Search of Illumination Invariants*, Int. Journal of Computer Vision.

A. Georghiades, P.N. Belhumeru, and D.Dkriegman. *From Few to Many: Generative models of Recognizing Faces Under Variable Pose and Illumination*. Proc. Fourth IEEE Int. Conf. On Automatic Face and Gesture Regocnition, pp. 277-284, 2000.

Shiguang Shan, Wen Gao, Bo Cao, Debit Zhao. *Illumination Normalization for Robust Face Recognition Against Varying Lighting Conditions,*. IEEE International Workshop on Analysis and Modeling of Faces and Gestures (AMFG), pp. 157-164, Nice, France, Oct. 2003.

T. Kanade and Y. Yamada.*Multi-subregion Based Probabilistic Approach Toward Pose-Invariant Face Recognition*. In IEEE International Symposium on Computational Intelligence in Robotics and Automation (CIRA2003), pp. 954-959, Kobe, Japan, 2003.

The Technology of FaceVACS (http://www/cognitec-systems.de/documentation/algo/algo.html).

Gottumukkal, Rajkiran et al., "An Improved Face Recognition Technique Based on Modular PCA Approach," Pattern Recognition Letters, Elsevier, Amsterdam, NI, vol. 25, No. 4, Mar. 1, 2004 pp. 429-436.

Jian, Huang et al., "Component-based LDA Method for Face Recognition With One Training Sample," Analysis and Modeling of Faces and Gestures, 2003. AMFG 2003. IEEE International Workshop on Oct. 17, 2003, Piscataway, NJ, USA, IEEE, Jan. 1, 2003, pp. 120-126.

Theodoridis S., Koutroumbas K: "Pattern Recognition, Passage" Pattern Recognition-Fourth Edition, Jan. 1, 2009, p. 230, 231, 254, 255, XP002543303, US, Burlington, MA: Academic Press.

Kittler J. et al: on Combining Classifiers IEEE Transactions on Pattern Analysis and Machine Intelligence, IEEE Service Center, Los Alamitos, CA, US, vol. 20, No. 3, Mar. 1, 1998, pp. 226-239, XP000767916.

Shiguang Shan et al: Illumination Normalization for robust face recognition against varying lighting conditions, Analysis and Modeling of Faces and Gestures, 2003. AMFG 2003. IEEE International Workshop on Oct. 17, 2003, Piscataway, NJ, USA, IEEE, Jan. 1, 2003 pp. 120-126, XP010664354.

Ahonen T. et al: "Face recognition based on the appearance of local regions", Pattern Recognition, 2004. ICPR 2004. Proceedings of the 17th International Conference on Cambridge , UK Aug. 23-26 2004, Piscataway, NJ, USA, IEEE, vol. 3, Aug. 23, 2004, pp. 153-156, XP010724623.

\* cited by examiner

APPARATUS FOR AND METHOD OF FEATURE EXTRACTION FOR IMAGE RECOGNITION

CROSS-REFERENCE TO RELATED APPLICATION

This application claims the benefit of Korean Application No. KR P2004-52643, filed Jul. 7, 2004 in the Korean Intellectual Property Office, the disclosure of which is incorporated herein by reference.

BACKGROUND OF THE INVENTION

1. Field of the Invention

The invention relates to image recognition through a comparison of stored images as compared to an image to be matched, and more specifically, to facial recognition whereby sub-regions of images are compared and/or normalized to account for lighting, expressions, and/or other conditions so as to improve the accuracy of the comparison.

2. Description of the Related Art

Facial recognition is a popular topic in biometric applications. Specifically, face recognition, and especially automatic facial recognition, is of interest as compared with iris or fingerprint recognition technologies. Such face recognition technology is of particular interest for security purposes. For instance, automatic facial recognition has been selected as an essential part of new versions of passports by many countries for implementation in one or two years. Additionally, facial recognition technology is also generally recognized as useful in, among other areas, crime prevention, national security, and private security purposes. Furthermore, face recognition is a worthy research topic and has promoted the development of pattern recognition and computer vision.

A problem with conventional automatic facial recognition technologies is that there is a greater need for an ordinary inspector (i.e., a user) to assist in the facial recognition since the existing technologies often fail. Specifically, in order to perform face recognition, the technology needs to account for the facial texture of the face, the 3D geometry of the face, the fact that the face is non-rigid and is thus capable of various expressions, any occlusions or blocking of features such as occurs with glasses or hair, and a complex illumination environment. These factors make face recognition a difficult problem.

Several studies have been reported in recent years that compare and evaluate the conventional face recognition algorithms and technology. Two such studies are published in D. Blackburn, M. Bone, and P. Phillips. Facial Recognition Vendor Test 2000: Evaluation Report, 2000, and in P. J. Phillips, H. Moon, S. Rizvi, and P. Rauss, *The FERET Evaluation Methodology for Face Recognition Algorithms*: IEEE Trans. On PAMI, 22(10): 1090-1103, (2000). These studies show that current algorithms are not robust against changes in facial expression, illumination, pose and occlusion.

Additionally, in performing face recognition, it is important that the feature selection be properly performed. If a good feature is selected, the classification would be a relatively easy task. For instance, with good feature selection, even simple classification techniques such as K-mean clustering or KNN processes based on Euclidian distance will work well. However, this method is dependent on an assumption that in the suitable feature subspace, the samples in the same class are Gaussian distributed and there is less overlap between different classes. However, while there has been a great deal of work to try and apply this method for face recognition, a suitable feature subspace needed to perform this method has not been found. For instance, no suitable feature subspace has been found in using Principal Components Analysis (PCA), Linear Discriminant Analysis (LDA), or Locality Preserving Projections (LPP) for face representation and feature selection. Generally, the PCA analysis seeks a projection that best represents the data in the least square sense, the LDA analysis seeks a projection that best separates the data in a least square sense, and LPP finds an embedding that preserves the local information, and obtains a face space that best detects the essential manifold structure.

Descriptions of the PCA, LDA, and LPP methods are described in M. Turk and Pentland, Face Recognition Using Eigenfaces (IEEE 1991), P. N. Belhumeur, J. P. Hespanda and D. J. Kriegman, Eigenfaces vs. Fisherfaces: *Recognition Using Class Specific Projection*, IEEE Trans PAMI, vol.19, No. 7, pp.711-720 (1997), and Xiaofei He, Shuicheng Yan, Yuxiao Hu, Hong-Jiang Zhang, *Learning a Locality Preserving Subspace for Visual Recognition*, Proceedings of the Ninth IEEE International Conference on Computer Vision, Pages 385-392 (ICCV 2003), the disclosures of which are incorporated by reference.

One of the reasons for the difficulty of face recognition feature selection is that face images reside on a nonlinear manifold (i.e., in a surface or space which is nonlinear). Due to the complex face manifold, the traditional Euclidian distance (i.e., a straight line distance between two points) used to determine a correspondence between images will not work for a face recognition task. To solve this problem a Geodesic distance (i.e., a shortest distance between two points, linear or non-linear) using ISOMAP was introduced to solve this problem. A more detailed description is found in Joshua B Tenenbaum, Vin de Silva, and John C. Langford, *A Global Geometric Framework for Nonlinear Dimensional Reduction*, Science, vol 290 (Dec. 22, 2000). However, some researchers have found that, in order to make ISOMAP work in practical usage, the parameter space needs to be decomposed into a series of overlapping convex pieces. As such, the difficulty of the manifold approach is that practical usage cannot provide abundant samples to describe a personal specific manifold such that the manifold approach still has a long way to go before practical usage is achieved.

SUMMARY OF THE INVENTION

According to an aspect of the invention, a system for performing image recognition includes an image input device which inputs a first image; a database having a set of reference images; and a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions.

According to an aspect of the invention, the comparison unit, after each comparison of the first and corresponding reference image sub-regions, stores an identification of which of the reference images has the sub-region with a greatest correspondence with the first image sub-region, and after a predetermined number of the first and reference image sub-regions have been compared, reviews the stored identifications to determine which of the reference images has a greatest number of reference image sub-regions corresponding to the first image sub-regions in order to determine which of the reference images has the greatest correlation to the first image.

According to an aspect of the invention, the comparison unit compares an $i^{th}$ first image sub-region with corresponding $i^{th}$ reference image sub-region of each of the reference images, and determines which of the reference images includes the $i^{th}$ reference image sub-region having a greatest correspondence to the $i^{th}$ first image sub-region, i=1 to D, and D is a number of first image sub-regions.

According to an aspect of the invention, the system further comprises a correction unit which compares each of the first image sub-regions with a mean for the corresponding first image sub-region to remove an influence of illumination and/or occlusion in each of the first image sub-regions to produce a corrected first image, wherein the comparison unit compares the corrected first image sub-regions with the reference image sub-regions to determine which of the reference images has the greatest correlation.

According to an aspect of the invention, the image input device is a camera which inputs the first image to the comparison unit, is a scanner which digitizes the first image and inputs the first image to the comparison unit, and/or is a memory reader which receives a memory which stores the first image and inputs the first image read from the memory to the comparison unit.

According to an aspect of the invention, the memory is included in an identification card.

According to an aspect of the invention, the identification card comprises a travel document card.

According to an aspect of the invention, the comparison unit comprises a processor which compares the first image sub-regions with corresponding reference image sub-regions of the reference images, and determines based on the comparison which of the reference images has the greatest correlation to the first image based on the comparisons between the reference image sub-regions and the first image sub-regions.

According to an aspect of the invention, the comparison unit comprises processors, where each of the processors compares at least one of the first image sub-regions with corresponding reference image sub-regions of the reference images, and determines based on the comparison which of the reference images has the greatest correlation to the first image based on the comparisons between the reference image sub-regions and the first image ub-regions.

According to an aspect of the invention, the comparison unit and the correction unit comprise a processor.

According to an aspect of the invention, the comparison unit comprises a first processor and the correction unit comprises a second processor other than the first processor.

According to an aspect of the invention, the comparison unit further stores the first image having the first image sub-regions in the database.

According to an aspect of the invention, the database comprises a storage medium disposed in a computer having the comparison unit.

According to an aspect of the invention, the database comprises a storage medium disposed in a computer other than a computer having the comparison unit.

According to an aspect of the invention, the first image is of a non-rigid surface.

According to an aspect of the invention, the non-rigid surface comprises a surface on a body element.

According to an aspect of the invention, the body element is a face.

According to an aspect of the invention, each of the first image sub-regions has a height h and a width w, the first image has a height H and a width W, and a number of first image sub-regions is int(H/h)*int(W/w).

According to an aspect of the invention, a size of each of the first image sub-regions is determined experimentally.

According to an aspect of the invention, the predetermined number of the first and reference image sub-regions comprises a total number of the first image sub-regions.

According to an aspect of the invention, the predetermined number of the first and reference image sub-regions is less than a total number of the first image sub-regions.

According to an aspect of the invention, the predetermined number of the first and reference image sub-regions is a number of sub-regions at which, based on comparisons of the first and reference image sub-regions made at the predetermined number, one of the reference images is determined to have the greatest correlation if it is a statistical impossibility for another of the reference images to have the greatest correlation to the first image.

According to an aspect of the invention, the comparison unit outputs identification information for the reference image having the greatest correlation.

According to an aspect of the invention, the identification information comprises a name of a person in the reference image.

According to an aspect of the invention, the comparison unit compares the first and reference images sub-regions by, for a $j^{th}$ image sub-region by calculating a label I for the $j^{th}$ sub-region as $$\underset{l(x_{jk})}{\operatorname{argmin}} \, dis\,(z_{jx} - x_{jk}), k = 1 \sim N, j = 1 \sim D,$$

and determining a D dimensional decision matrix $Y=[y'_1, y'_2, \ldots t'_D]$ as $$y'_{ji} = \begin{cases} 1, \text{ for } i = l \\ 0, \text{ for } i \neq l \end{cases},$$

$z_{jx}$ is the $j^{th}$ image sub-region of the first image, $x_{jk}$ is the $j^{th}$ image sub-region of the reference image, and D is a number of sub-regions.

According to an aspect of the invention, the system further comprises a feature identification unit which identifies at least one predetermined feature of the first image so as to normalize the first image as compared to the reference images, wherein the comparison unit receives the normalized first image having been divided into first image sub-regions.

According to an aspect of the invention, the system further comprises a correction unit which compares each of the reference image sub-regions with the mean for the corresponding reference image sub-region to remove an influence of illumination and/or occlusion in each of the reference image sub-regions to produce corrected reference image, wherein the comparison unit compares the corrected first image sub-regions with the corrected reference image sub-regions to determine which of the reference images has the greatest correlation.

According to an aspect of the invention, the database stores corrected reference images in which each of the reference image sub-regions with the mean for the corresponding reference image sub-region to remove an influence of illumination and/or occlusion in each of the reference image sub-regions, wherein the comparison unit compares the corrected first image sub-regions with the corrected reference image sub-regions to determine which of the reference images has the greatest correlation.

According to an aspect of the invention, the mean comprises an average value for a representative number of each reference image sub-region calculated as follows:

$$\frac{1}{N} \sum_{x_i \in trainingset} x_i,$$

N is a number of images of the training set, and the training set comprises ones of the reference images.

According to an aspect of the invention, a system for performing image recognition, the system comprises an image input device which inputs a first image; a database having a set of reference images; and a correction unit which receives the first image having been divided into first image sub-regions, compares each of the first image sub-regions with a mean for the corresponding first image sub-region to remove an influence of illumination and/or occlusion in each of the first image sub-regions to produce corrected first image sub-regions, and produces a corrected first image based on the corrected first image sub-regions.

According to an aspect of the invention, the correction unit further performs an adaptive gamma correction for each of the first image sub-regions in order to provide the corrected first image sub-regions.

According to an aspect of the invention, the correction unit selects a Gamma parameter for each of the first image sub-regions by minimizing a distance between a pair wise $k^{th}$ first image sub-region and $k^{th}$ sub-region of a mean image as follows, $I_{xy}^{k'} = G(I_{xy}^{k}; \gamma^{k*})$, computes $\gamma^{k*}$ as follows, $$\gamma^{k*} = arg \min_{\gamma} \sum_{x,y} dis(G(I_{xy}^{k}; \gamma^{k}) - I_{0xy}^{k}),$$

and performs Gamma correction as follows:

$$G(I_{xy}; \gamma) = c \cdot I_{xy}^{\frac{1}{\gamma}},$$

$I^k$ is the $k^{th}$ first image sub-region of the first image, $I_o^k$ is the $k^{th}$ sub-region of the mean image, I is the first image, $I_o$ is the mean image, and c is a constant.

According to an aspect of the invention, the mean image comprises an average value for a representative number of each reference image sub-region calculated as follows:

$$\frac{1}{N} \sum_{x_i \in trainingset} x_i,$$

and N is a number of images of the training set of reference images.

According to an aspect of the invention, the processor further performs a histogram equalization for each of the first image sub-regions to provide the corrected first image sub-regions.

According to an aspect of the invention, the image input device is a camera which inputs the first image to the comparison unit, is a scanner which digitizes the first image and inputs the first image to the comparison unit, and/or is a memory reader which receives a memory which stores the first image and inputs the first image read from the memory to the comparison unit.

According to an aspect of the invention, the system further comprises a writing unit which records the corrected first image on a storage medium as part of a database of corrected images.

According to an aspect of the invention, the system further comprises a correlation system comprising: a database having a set of reference images; and a comparison unit which receives the corrected first image from the correction unit, compares the first image with the reference images, and determines based on the comparison which of the reference images has a greatest correlation to the first image based on the comparisons.

According to an aspect of the invention, in order to determine the greatest correlation, the comparison unit performs one of a Principal Components Analysis (PCA), a Linear Discriminant Analysis (LDA), and a correlation method.

According to an aspect of the invention, a method of determining a correspondence between an obtained image divided into obtained image sub-regions and a set of reference images divided into corresponding reference image sub-regions, comprises determining a greatest correlation between one of the obtained image sub-regions and corresponding one reference image sub-regions; determining another greatest correlation between another one of the obtained image sub-regions and corresponding another reference image sub-regions; and selecting one of the reference images based upon the one and another greatest correlations.

According to an aspect of the invention, the method further comprises determining the remaining greatest correlations between the remaining ones of the obtained image sub-regions and the corresponding remaining image sub-regions, wherein the selecting comprises determining which one of the reference images is most frequently determined to have the greatest correlation for the obtained image sub-regions.

According to an aspect of the invention, a method of removing an influence of illumination and/or occlusions of an obtained image, includes, for each sub-region of an obtained image, determining a sub-region factor which minimizes a difference between the sub-region and a mean for the sub-region; and applying the sub-region factor to the corresponding sub-region for each of the sub-regions such that the entire obtained image is corrected.

According to an aspect of the invention, the factor comprises an adaptive gamma correction which minimizes a difference between the corresponding sub-region and the mean associated with the sub-region.

According to an aspect of the invention, the method further comprises storing the corrected obtained image.

According to an aspect of the invention, the method further comprises using the corrected obtained image to determine a correlation between the corrected obtained image and another image.

According to an aspect of the invention, the using the corrected obtained image further comprises: determining a correlation between one of the sub-regions of the corrected obtained image and a corresponding one sub-region of the another image; determining another correlation between another one of the corrected obtained sub-regions and a corresponding another sub-region of the another image; and determining an overall correspondence between the corrected obtained image and the another image based upon the one and another correlations.

According to an aspect of the invention, the using the corrected obtained image to determine the correlation comprises using a Principal Components Analysis, and/or a Linear Discriminant Analysis.

According to an aspect of the invention, at least one computer readable medium encoded with processing instructions for implementing a method performed by at least one computer, the method comprising determining a greatest correlation between one of the obtained image sub-regions and corresponding one reference image sub-regions; determining another greatest correlation between another one of the obtained image sub-regions and corresponding another reference image sub-regions; and selecting one of the reference images based upon the one and another greatest correlations.

According to an aspect of the invention, at least one computer readable medium encoded with processing instructions for implementing a method performed by at least one computer, the method comprising, for each sub-region of an obtained image, determining a sub-region factor which minimizes a difference between the sub-region and a mean for the sub-region; and applying the sub-region factor to the corresponding sub-region for each of the sub-regions such that the entire obtained image is corrected.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
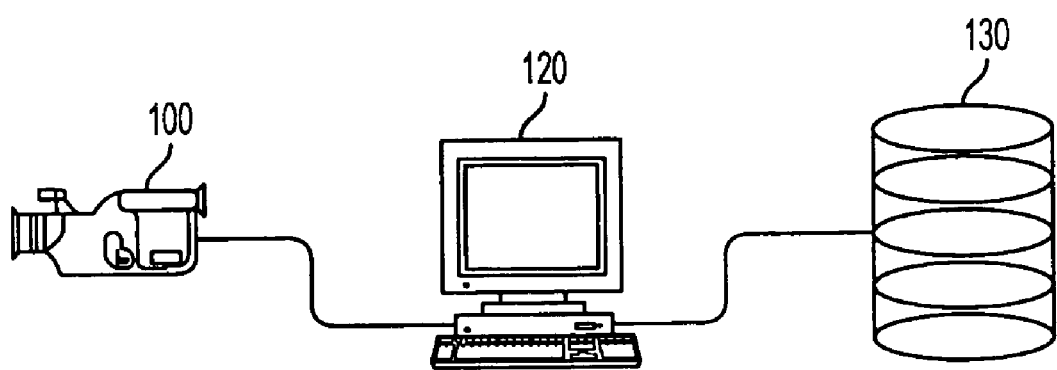
FIG. 1 is a block diagram of a facial recognition system according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram of an apparatus which performs the facial recognition according to an aspect of the present invention. As shown in FIG. 1, a camera 100 is connected to a computer 120. The computer 120 accesses a database 130 on which are stored reference images of known faces. The camera 100 is used to obtain an image of a face to be identified. As shown, the camera 100 is a 5 mega pixel, 320*240 resolution digital camera. However, it is understood that the camera 100 can have other resolutions, and that the camera 100 can be part of a personal digital assistant (PDA), a telephone, a security camera used in a security system, a video camera from which individual images of frames (such as in MPEG video) are used for identification, or other similar device having a capacity to take pictures according to aspects of the invention. Moreover, it is understood that, instead of or in addition to the camera 100, a scanner (not shown) can be used as a digital image input device in order to scan non-digital pictures into the computer 120, or the digital image can be otherwise provided to the computer 120 according to aspects of the invention. Lastly, while shown as connected, it is understood that the camera 100 need not be connected to the computer 120 in all aspects of the invention, and instead can transfer pictures either through the scanner (not shown), by uploading the image from a storage medium on which the camera 100 stores pictures into the computer 120, or across a networks using wired and/or wireless transmission techniques.

Once the image is loaded into the computer 120, the computer 120 is used to identify landmarks on the picture, and then divide the image into sub-regions. The divided sub-regions are each subjected to a sub-region based adaptive Gamma (SadaGama) correction or sub-region based histogram equalization (SHE) and/or a Most-Informative Feature Extraction (MIFE) process according to aspects of the invention as explained in detail below. The computer 120 compares the corrected sub-regions with corresponding sub-regions of reference images stored in the database 130. Based on a comparison of each of the corrected sub-regions of the images, the computer 120 indicates which of the reference images stored in the database 130 most closely resembles the image inputted to the computer 120 using a majority voting method as set forth in greater detail below.

In the shown embodiment, the computer 120 is a 1 Ghz, 256-megabyte personal computer. However, it is understood that the computer 120 can be other types of computers, both general and special purpose, and can be portable or non-portable. Moreover, it is understood that the computer 120 can be a series of computers which collectively analyze corresponding different sub-regions of the image and the reference images stored in the database 130, such as through the use of grid computing or parallel processing, so as to collectively determine which of the reference images corresponds to the input image. Moreover, where the computer 120 is portable, the computer 120 can also be a personal digital assistant or like portable computing device which performs the comparison and/or receives the comparison result from a connected device according to aspects of the invention.

Additionally, in the shown embodiment, the database 130 is shown as separate from the computer 120 for the purposes of explanation. It is understood that, according to an aspect of the invention, the database 130 is preferably included in the computer 120 in order to reduce transfer time across a network. If the database 130 is stored separately according to an aspect of the invention, the database 130 is connected to the computer 120 across a network, such as a local area network, the Internet, or other wired or wireless networks. As such, where the reference images are used to identify persons such as for the purposes of security, the reference images on the database 130 can be used by any number of computers 120 at different locations for use in identifying persons being photographed by a camera 100 at each of the different locations. Thus, using a single location, the database 130 can be kept current according to an aspect of the invention. Alternately, the database 130 can be mailed or transmitted to each location for use within the corresponding computer 120, or the database 130 at each location can be updated from the single location across a network according to an aspect of the invention. Such a separately stored database 130 can be stored in a separate location, such as a Government agency, for use in verifying passport identities or for identifying persons wanted by various law enforcement agencies by way of example.

Such a database 130 can comprise data stored on storage media, such as magnetic media such as a hard disc drive, on magneto-optical media, and on optical media such as compact discs (CDs), digital versatile discs (DVDs), and next generation optical discs such as Bluray discs and Advanced Optical Discs (AODs) according to aspects of the invention. Moreover, the database 130 can be read only, write once, or rewritable media. Where the database 130 is writable or rewritable, it is understood that the reference images can be updated to reflect new images without retransmitting all images in the database 130. Such an updatable property would be useful where a new individual is first recognized at one of the locations, and the remaining locations can there be updated to reflect the new individual's image so as to keep the database 130 current.

FIGS. 2 through 5 show embodiments of the methods used to prepare the input images and/or reference images for comparison, and the actual comparison of the input images and reference images according to aspects of the invention. It is understood that, while not required in all aspects of the invention, the method of FIGS. 2 through 5 can be implemented, at least in part, using computer software readable by a processor or processors, such as the computer 120.

As background for the methods of FIGS. 2 through 5, it is assumed that there are N labeled training samples which belong to C classes. The N labeled samples are denoted in D dimensional feature space as $x_i=[x_{1i}, x_{2i}, \ldots, x_{Di}]^T$, where $x_i$, $I=1, 2, \ldots, N$. Each image I is a matrix having a size M=H*W, where H is height in pixels and W is width in pixels. Each sample vector $x_i$ has a classification label, $k=I(x_i)$, which means $x_i$ belongs to a $k^{th}$ class. Label vector $y(x_i)$ is a C dimension vector, which is defined in equation (1) below as:

$$\{x_i, y(x_i)\} \tag{1}$$

$$y_k(x_i) = \begin{cases} 1, & l(x_i) = k \\ 0, & \text{other} \end{cases} k \in \{1, 2, \ldots, C\}$$

C is defined as a number of the classes. In the context of facial recognition, C defines the number of classes of people in the training set, with each person being one class of the C number of classes. Each person can further include multiple images in that person's class. As such, the training set includes C classes, with each class including one or more images for use in the training set.

A nearest neighbor clustering criteria based on Euclidian or Mahalanobis distance may be calculated as follows to determine if a vector Z belongs to an $I^{th}$ class using equation (2) below. In equation (2), and Z corresponds to an unknown sample vector.

$$l = \arg\min_{l(x_k)} dis(z, x_k) \; k \in \{1, 2, \ldots, N\} \tag{2}$$

In equation (2), dis $(z, x_k)$ can be a Euclidian or Mahalanobis distance according to aspects of the invention. However, in the shown embodiment, dis $(z, x_k)$ is the Euclidian distance.

According to equations (1) and (2), the vector for the image Z, y'(z), is calculated using equation (3) as:

$$y'_i(z) = \begin{cases} 1, & \text{for } i = l \\ 0, & \text{for } i \neq l \end{cases} i \in \{1, 2, \ldots, C\} \tag{3}$$

Because this simple, but effective, method works when the data of the same class is a Gaussian distribution (or at least a convex distribution), there is less overlap between different classes. A great deal of practical data is independent and randomly distributed. Thus, the use of Gaussian distributions and Euclidian distances is very popular for the purposes of analysis.

However, for automatic face recognition purposes, the texture, the 3D geometry of and non-rigid nature of the face, and the complex illumination environment makes it very difficult to find a feature space in which the facial feature vectors are Gaussian distributed. This is a reason that conventional face recognition technology is difficult to practically implement. As such, in an aspect of the present invention, there is a balance between the simple Euclidian distance and the complex Geodesic distance to make an improvement to the solution of the facial recognition problem.

By way of example, where an image size is M×H, each pixel is assigned a value of 0 to 255. Assuming that the sub-region of the image is 81 pixels (i.e., with the size of 9×9), the Euclidian distance is calculated using the summation of the value for the 81 pixels of the sub-region as compared to the value of the 81 pixels summed in the corresponding sub-region of each of the reference images stored in the database 130 according to an aspect of the invention.

Figure 2:
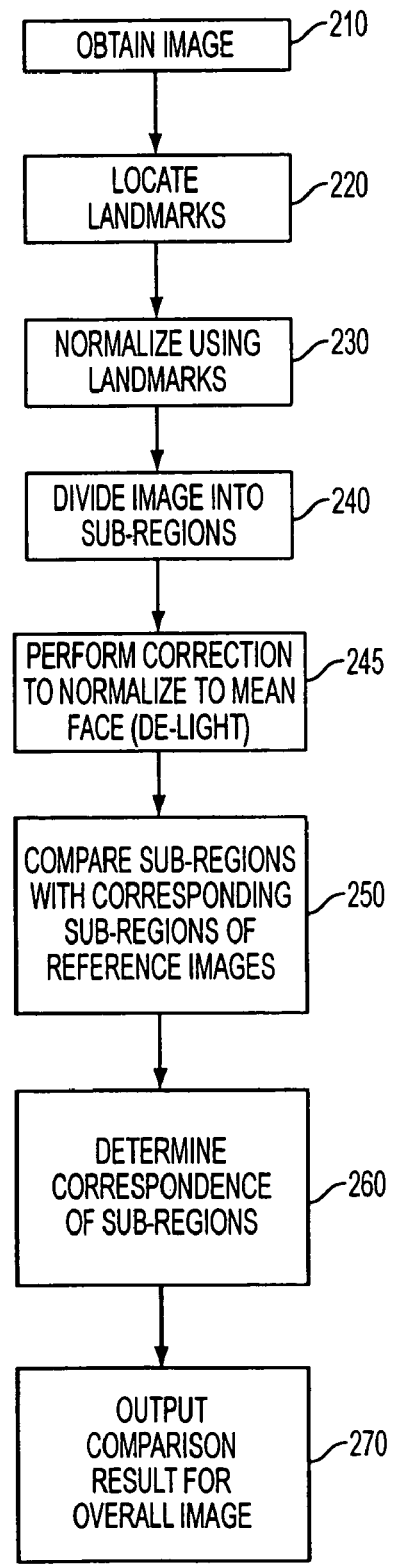
FIG. 2 is a flowchart of a method of performing feature extraction according to an aspect of the invention.

According to an aspect of the invention shown in FIG. 2, an image to be identified is first obtained (operation 210). In the embodiment shown in FIG. 1, the camera 100 obtains the image and provides the obtained image to the computer 120. However, it is understood that the image can be instead scanned or uploaded to the computer 120.

Once the image is obtained, a user reviews the obtained pictures and manually locates certain landmarks (operation 220). While shown as being performed manually, it is understood that such landmark identification could be performed, at least in part, automatically according to an aspect of the invention. Examples of such landmarks include, but are not limited to, the eyes and mouth. Once the landmarks are obtained, the computer 120 detects coordinates for the landmarks and normalizes the image using the coordinates (operation 230). The computer 120 divides the normalized image into sub-regions (operation 240). An example of an array of such sub-regions is shown in FIGS. 6A through 6C.

Figure 6A:
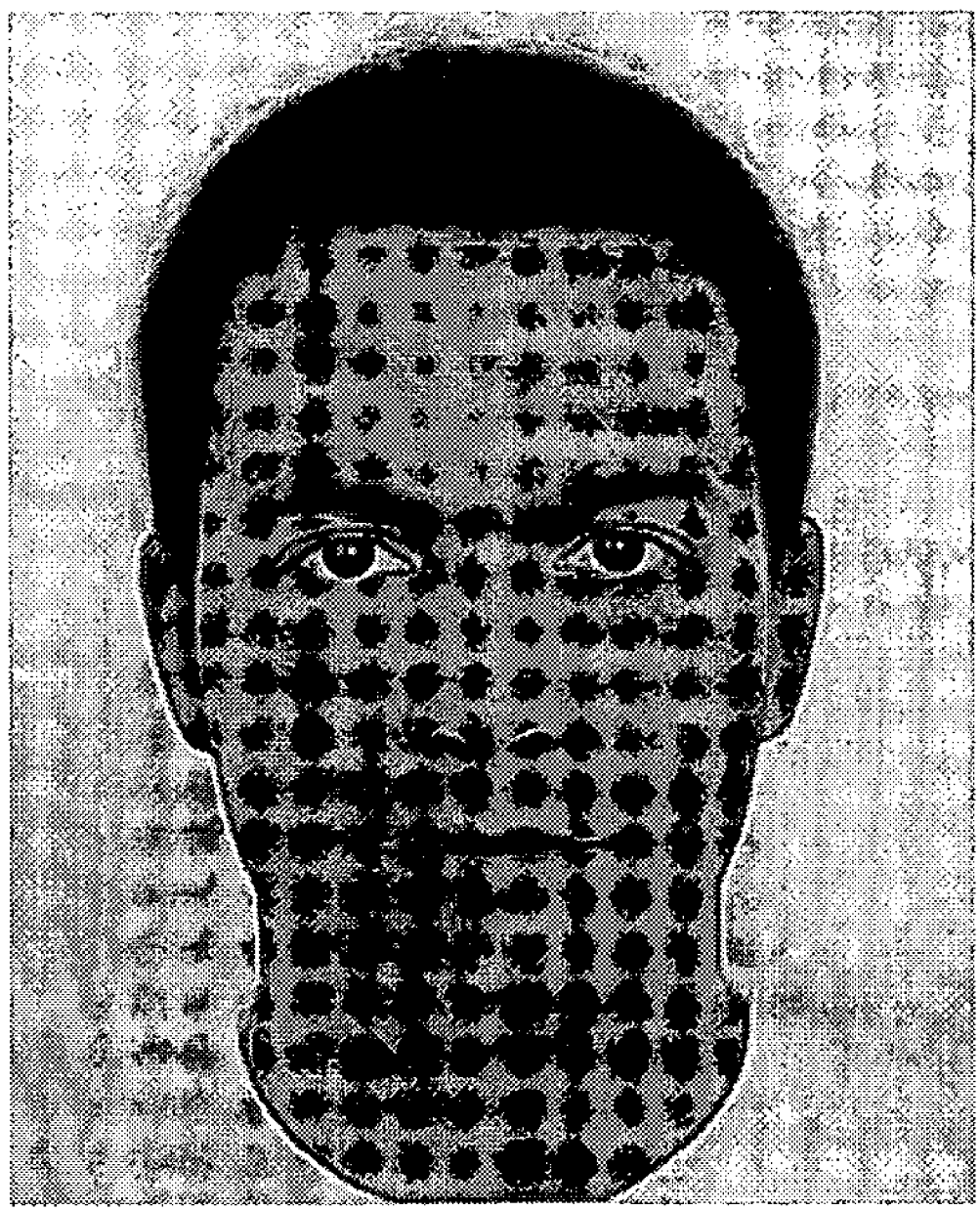
FIGS. 6A through 6C are photographs showing an example of normalization and sub-region division according to aspects of the invention.

As shown in FIG. 6A, three facial landmark points (the pupils of both eyes and the center of the mouth) are manually located as per operation 220. However, it is understood that additional numbers of landmarks can be used, and that other landmarks (such as the ears, eyebrow, nose, chin, etc.) could be useful. After using an affine transformation in order to preserve collinearity and distance ratios between the landmarks (if needed), the pupils' x-y coordinate and mouth's y coordinate are cropped to the same dimensions needed to perform operation 240 as shown in FIG. 6B. As such, the coordinates of the landmarks (i.e., the pupils and mouth) are located for use in operation 230. While shown as rectangular and having a uniform size in FIG. 6C, it is understood that the sub-regions can have other shapes, can have linear and/or curvilinear sides, can be non-uniform in size, and/or can be sized in certain sub-regions based on a facial feature expected to be in a location (e.g., general shape of nose, eyes, etc.) according to aspects of the invention.

Figure 6B:
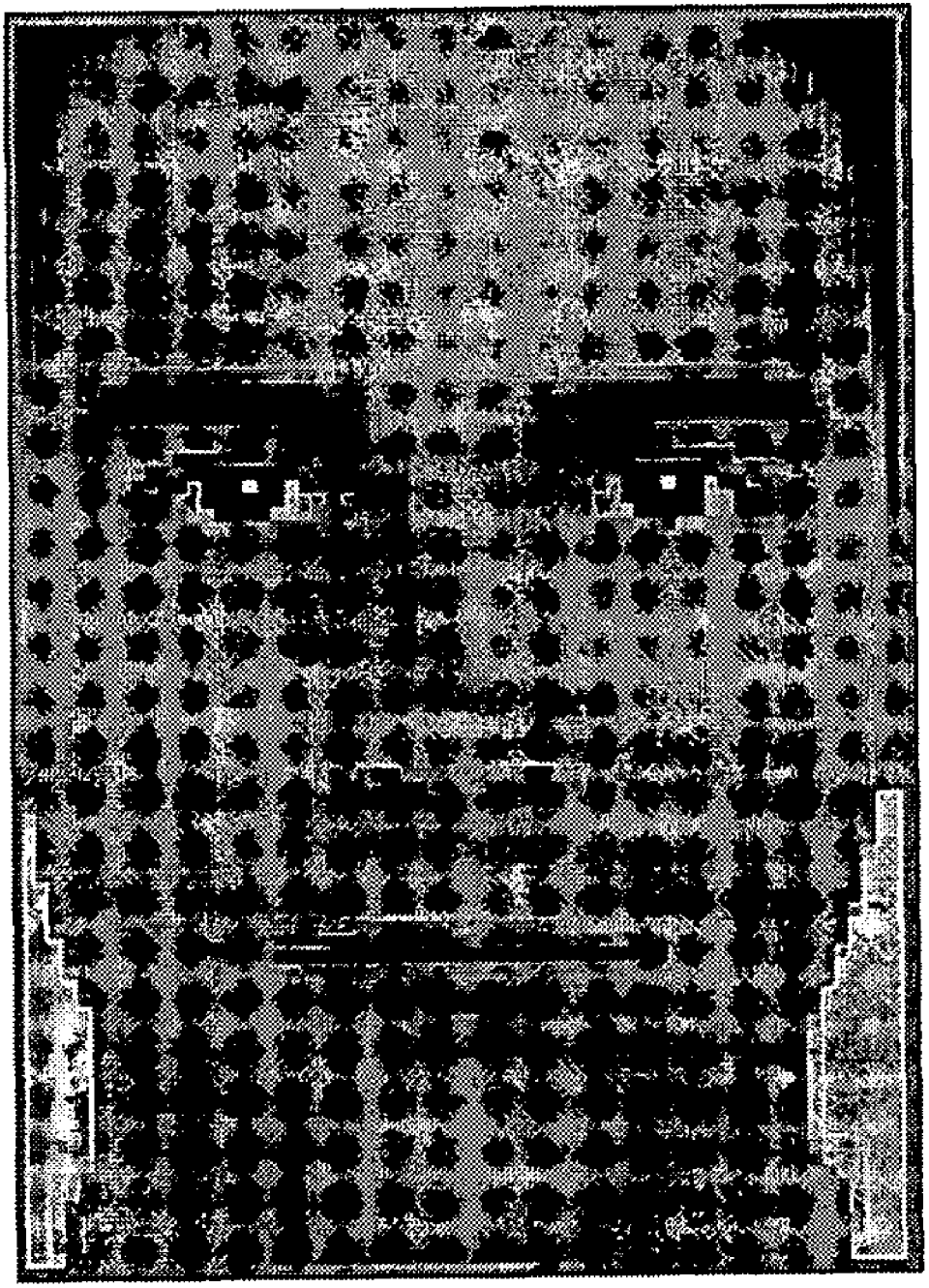
Figure 6C:
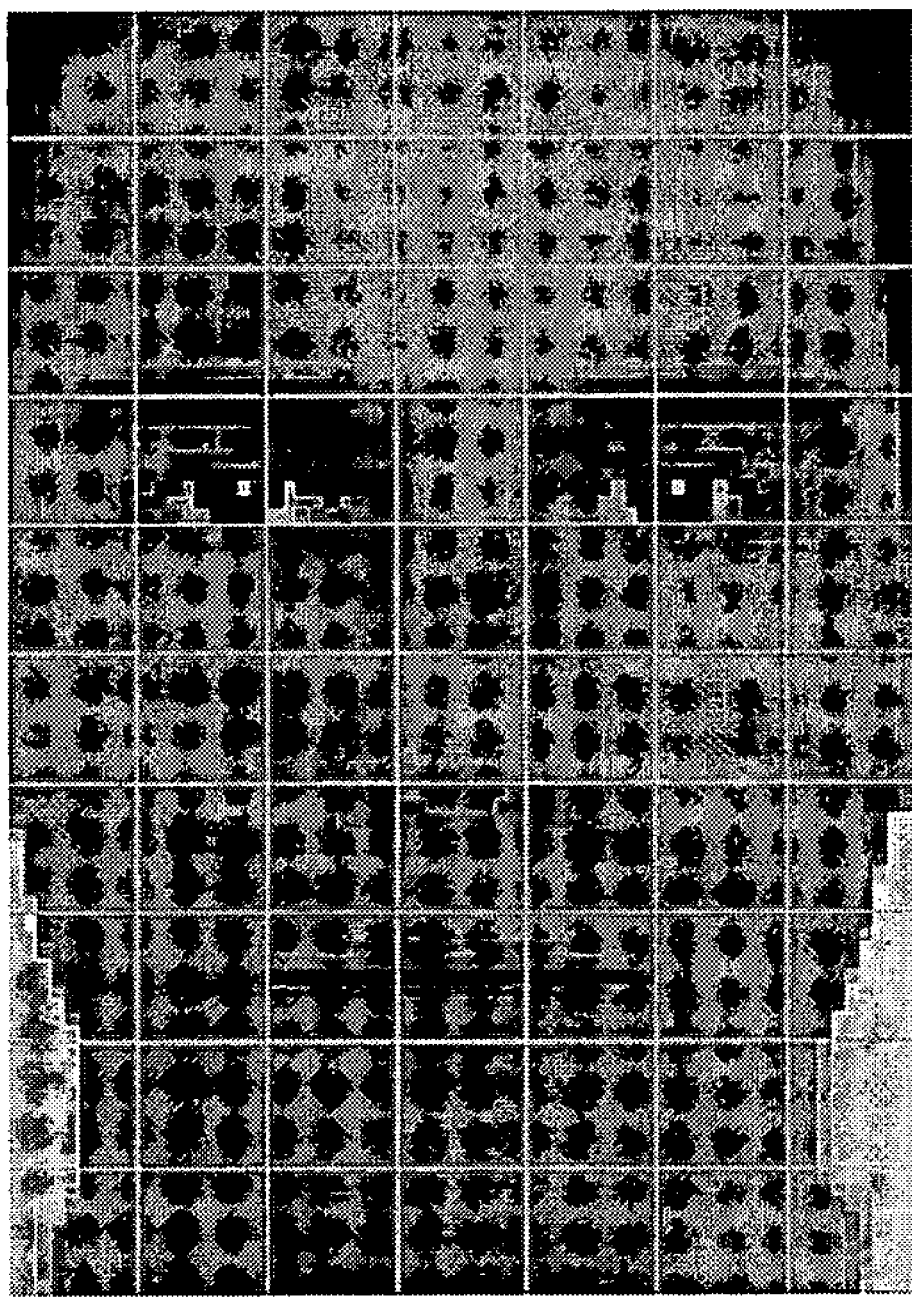

For face recognition image shown in FIGS. 6A through 6C, the image space is constructed by the images with H for height and W for width thus to make a H*W=90*63=5670 facial image vectors I, (i=1, 2, ..., N). The face image is divided into different sub-regions with the size of h*w=9*9=81. Here, the dimension feature space D=int(H/h)*int(W/w)=int(90/9)*int(63/9)=10*7=70. As shown in FIG. 6C, there are thus 70 sub-regions in the facial image defining a 70-dimension feature space. While the above sizes are presented by way of example, it is understood that other sizes can be used.

Additionally, it is important to choose a suitable size of each sub-region in order to perform face recognition. If the sub-region is too small, different peoples' faces will become essentially the same, making recognition difficult. However, if the sub-region is too large, it becomes difficult to discard (i.e., remove) the illumination for the same person so as to further complicate face recognition.

According to an aspect of the invention, the sub-region size is chosen based on experimental data. Specifically, an optimal size of a sub-region can be determined experimentally based on a final face recognition result using a known database, whereby the error rate is used to determine a size suitable for the recognition task. Table 1 shows experimental results using different size sub-regions in order to determine a size of the sub-region which provides an acceptable error ratio. In Table 1, the error ratio results are based on the Yale-B face database using the system of FIG. 9. The images used in the experiment to determine the sub-region size have H for height and W for width to make a H*W=90*63=5670 facial image vectors $I_i$ (where i=1, 2, ..., N). As indicated in Table 1, the face image was divided into different sub-regions with the size of h*w=9*9=81, which results in 70 sub-regions as shown in FIG. 6C.

TABLE 1

| Sub-region size | Subset 2 | Subset 3 | Subset 4 |
|---|---|---|---|
| 15*21 | 0 | 0.0083 | 0.2857 |
| 9*15 | 0 | 0 | 0.1714 |
| 9*9 | 0 | 0 | 0.0429 |

Once the image is divided into sub-regions in operation 240, the computer 120 performs operation 245 to normalize the image to a mean face (i.e., de-light), which will be explained in detail below in relation to FIG. 5. However, it is understood that operation 245 need not be performed in all aspects of the invention.

Figure 10:
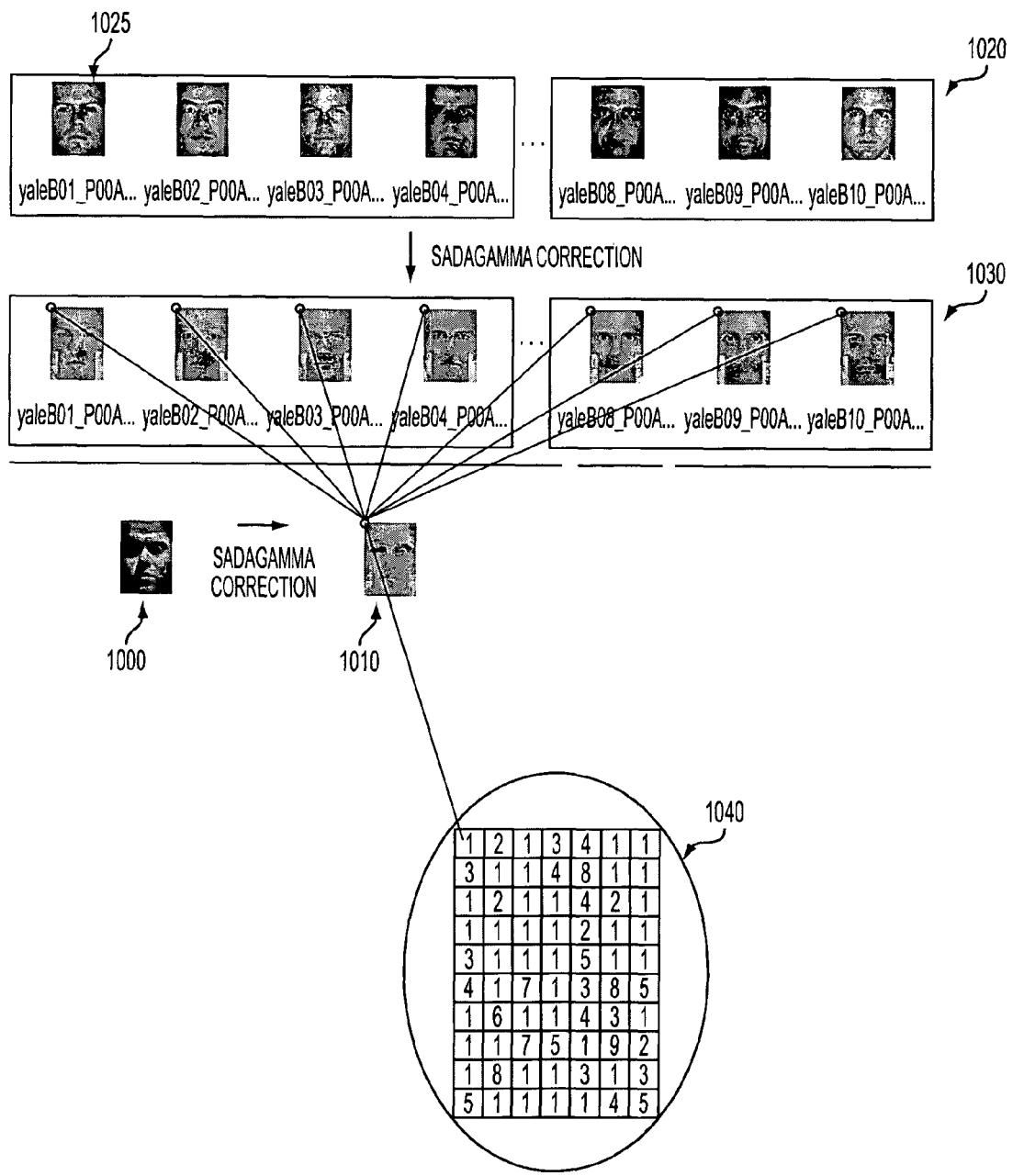
FIG. 10 shows an example of performing de-lighting and most informative feature extraction for photographic images according to an aspect of the invention.

After operation 245, the computer 120 compares each sub-region of the obtained image with a corresponding sub-region of the reference images in order to obtain classification information for each sub-region of the obtained image (operation 250). When classification information is obtained for each of the sub-regions of the obtained image, the computer 120 determines which of the reference images has the most sub-regions in common with the sub-regions of the obtained image (operation 260). The computer 120 outputs the determined reference image as corresponding most closely to the obtained image (operation 270). Graphically, the process is shown in FIG. 10, as will be explained in greater detail below.

While not required in all aspects, such an output could include a name and other personal information of the person associated with the determined reference image. Such output could further include any information deemed useful for security purposes, such as whether there are criminal or civil violations of the individual in the obtained image of which the user should be aware, or determine whether a person can access a service or enter a location. Examples of such services include, but are not limited to, accessing banking services or making purchases. It is further understood that the obtained image used in the method of FIG. 2 can be stored in the database 130 in order to obtain additional images of the identified person (and possibly increase the likelihood of detection) and/or to include a new person not previously known.

As noted above, in order to perform the comparison, each sub-region of the image is bounded by a first set of coordinates. The sub-region is compared with sub-regions of the reference images which are bounded by the first set of coordinates so as to perform a comparison at the sub-region level instead of comparing the images as a whole. By way of example, for a $j^{th}$ sub-region of $I_x$, or $z_{jx}$, of an 81 dimensional vector, a label I for the $j^{th}$ sub-region can be calculated using equation (4) as follows:

$$l = arg \min_{l(x_{jk})} dis(z_{jx} - x_{jk}), k = 1 \sim N, j = 1 \sim D \qquad (4)$$

Consistent with equations (1) through (3), $y'_{jk}$ is calculated using equation (5) as follows:

$$y'_{ji} = \begin{cases} 1, \text{ for } i = l \\ 0, \text{ for } i \neq l \end{cases} \qquad (5)$$

As a result, a D dimensional decision matrix Y=[$y'_1, y'_2, \ldots y'_D$] is obtained for $I_x$. Therefore, each sub-region of the obtained and reference images is used make a decision for the classification task.

Figure 3:
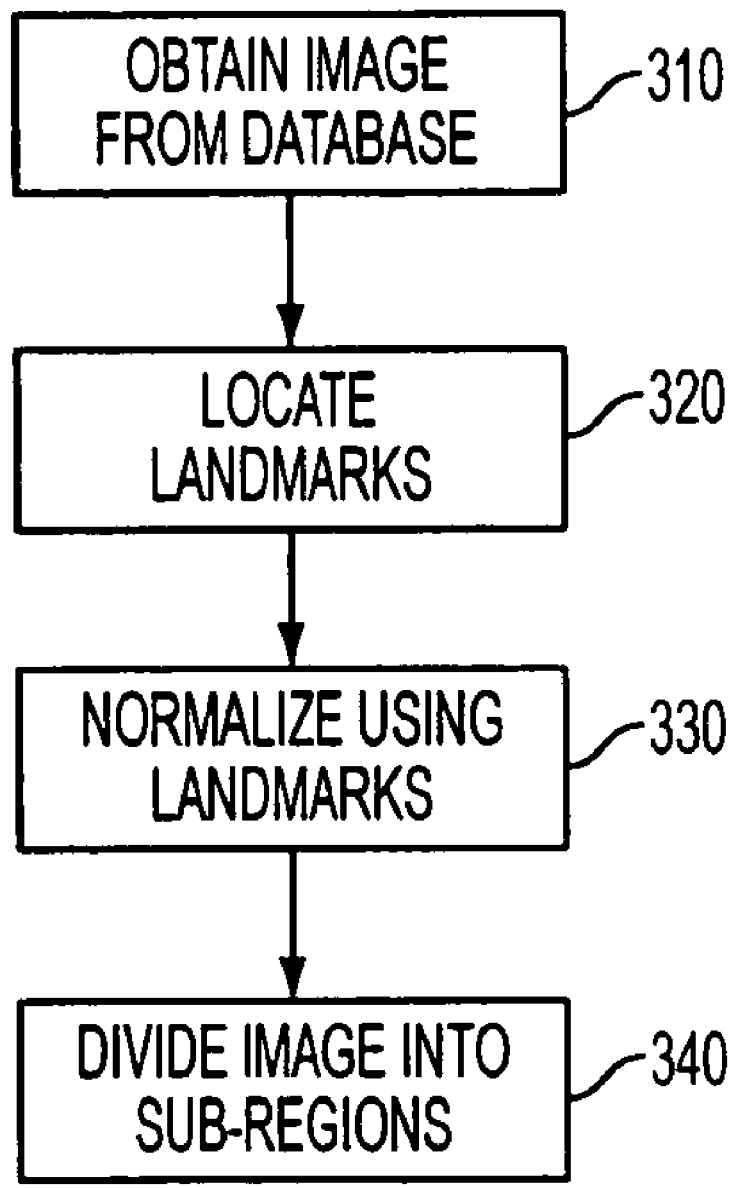
FIG. 3 is a flowchart of a method of preparing reference images for use in the method of FIG. 2 according to an aspect of the invention.

As shown in the embodiment of the invention shown in FIG. 3, each reference image is obtained (operation 310). According to aspects of the invention, the reference image can be obtained in operation 310 directly from the database 130, or can be obtained from another location for processing prior to being stored on the database 130. The computer 120 is used to manually locate the landmarks (operation 320), obtain coordinates for the landmarks and normalizes the image (operation 330). The computer 120 further divides the sub-regions (operation 340) consistent with operations 220 through 240 shown in FIG. 2.

Figure 9:
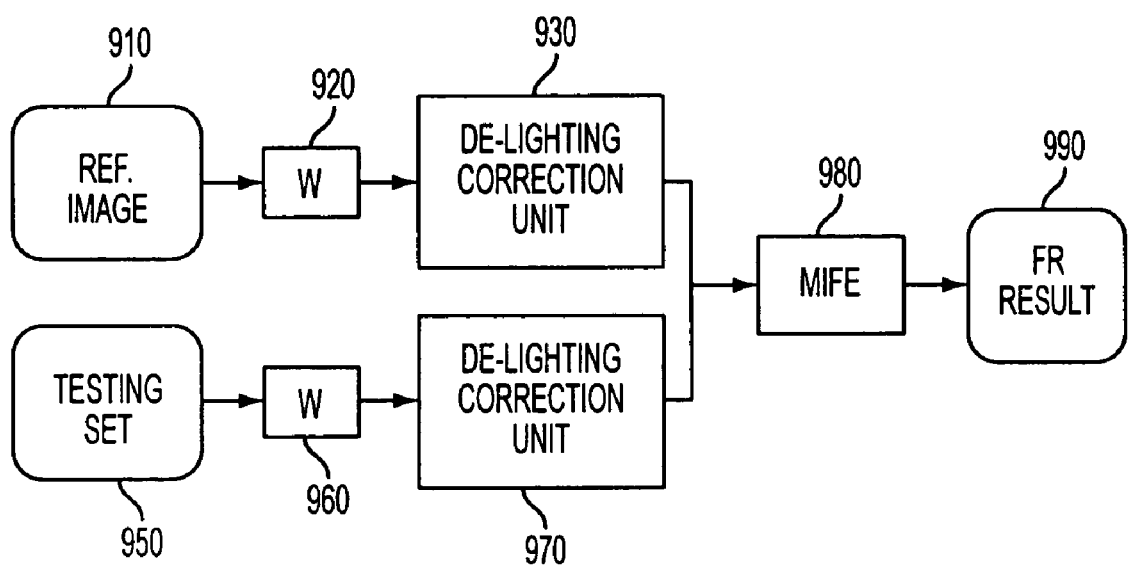
FIG. 9 is a schematic block diagram of a system for performing de-lighting and most informative feature extraction according to an aspect of the invention.

According to an aspect of the invention, the computer 120 performs both operations 220 through 240 and operations 320 through 340 at the same time so as to have sub-regions with which to make a comparison in operation 250. Schematically, this system is shown in FIG. 9, which will be explained in detail below. However, it is understood that the computer 120 can perform operations 320 through 340 at different times so as to reduce the computations performed during the process performed in FIG. 2 according to an aspect of the invention. Moreover, it is understood that another computer (not shown) other than the computer 120 could be used to perform the method of FIG. 3 separately from the process being performed in FIG. 2 according to an aspect of the invention. Lastly, it is understood that the results of the method shown in FIG. 3 can be stored in the database 130 such that the process is not performed multiple times for a same reference image according to an aspect of the invention.

Figure 4:
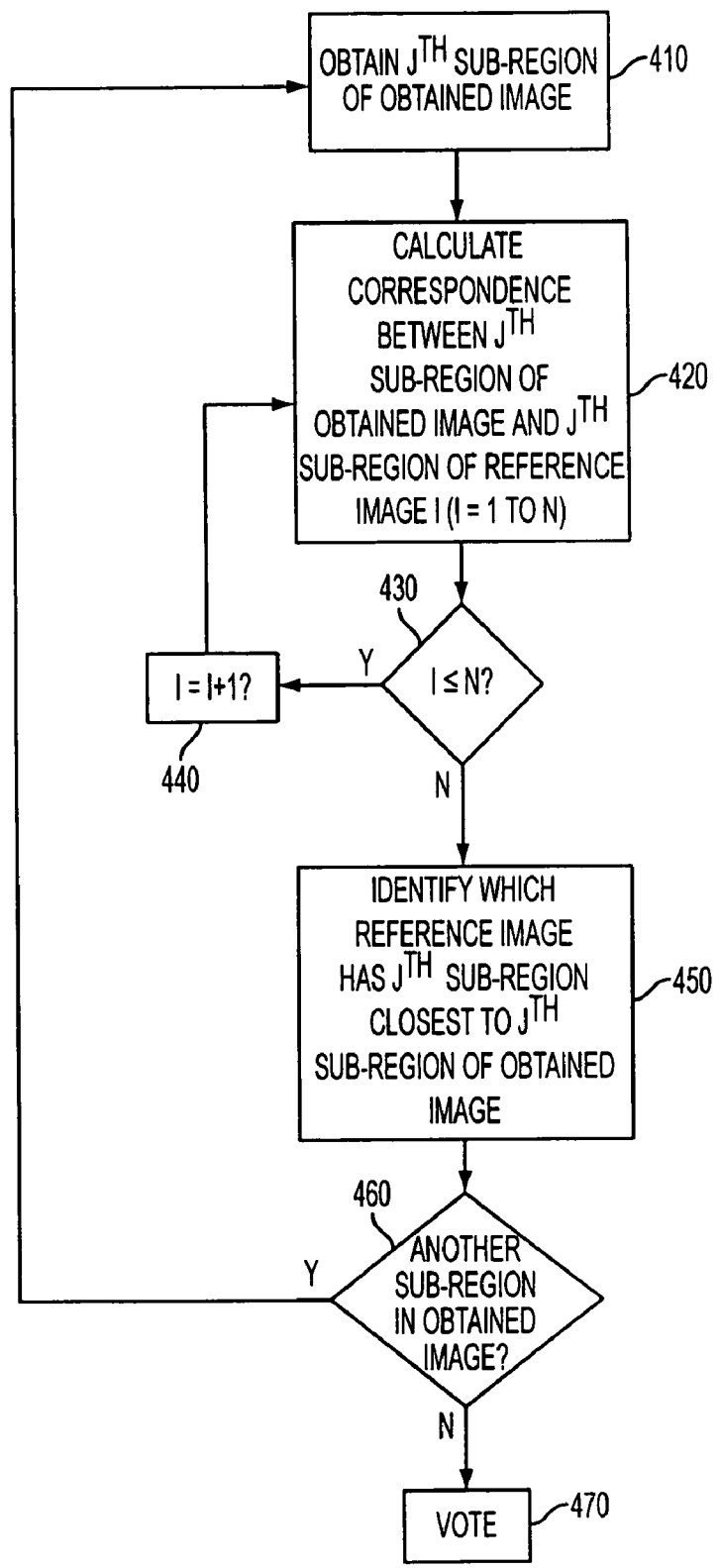
FIG. 4 is a flowchart of a method of comparing sub-regions for use in the method of FIG. 2 according to an aspect of the invention.

According to an aspect of the invention, operations 250 and 260 can be performed as shown in the embodiment in FIG. 4. Each sub-region $j_i$ is obtained from the obtained image (operation 410), and a comparison is made between the sub-region $j_i$ of the obtained image and the sub-region $j^{th}$ of the first reference image (operation 420). The comparison result is stored. In operation 430, it is determined if another reference image exists (i.e., i n). If another reference image exists, the sub-region $j_{i+1}$, for the next reference image is obtained (operation 440) and a comparison is made for the sub-region $j_{i+1}$ in operation 420. Once the sub-region $j_N$ for the final reference image is compared, the computer 120 identifies which of the reference images 1 through N had the closest correspondence with the sub-region j of the obtained image (operation 450). The computer 120 stores the reference image having the closest correspondence for sub-region j. Where there is another sub-region j+1 to be analyzed, the computer 120 begins operations 410 through 450 using the next sub-region j+1 for the obtained image (operation 460). When all of the sub-regions of the obtained image have been analyzed, the computer determines which of the reference images has the most sub-regions in common with the sub-regions of the obtained image (operation 470).

In order to obtain a final decision by which the one of the reference images having a greatest correspondence to the input image in operation 270, an aspect of the invention utilizes a majority voting technique. Specifically, according to an aspect of the invention, the computer 120 uses a simple criterion to get the final decision by majority voting according to equation (6):

$$l = \max_j \sum_{i=1,\ldots,D} y_{ji} \quad (6)$$

By this way, each sub-region's classification information is separated and makes an individual contribution for the recognition task as a whole.

Using the sub-regions, the computer 120 compares the image with reference images stored in the database 130 (operation 260). While not required in all aspects, it is preferred that the reference images are stored having had their landmarks identified and sub-regions already defined using the process in FIG. 3. However, it is understood that, instead of storing the reference images in the database 130 with the sub-regions defined, operations 220 through 250 can be performed on the reference images either as the same operations 220 through 250 are performed on the image obtained from the camera 100 or prior to operation 260.

During operation 260, each sub-region of the obtained image is compared with corresponding sub-regions of the reference images that are disposed in a same image space on the reference images according to an aspect of the invention. By taking each sub-region of the facial image vector independently into consideration according to aspects of the invention, more useful information may contribute to the final decision in operation 270, thus improving the accuracy of the facial recognition process. This information is otherwise lost such as occurs when the K-Mean or KNN Euclidian criteria are since when the dot product required in these techniques decreases the high dimensional feature or image vector to one-dimensional distance.

Figure 5:
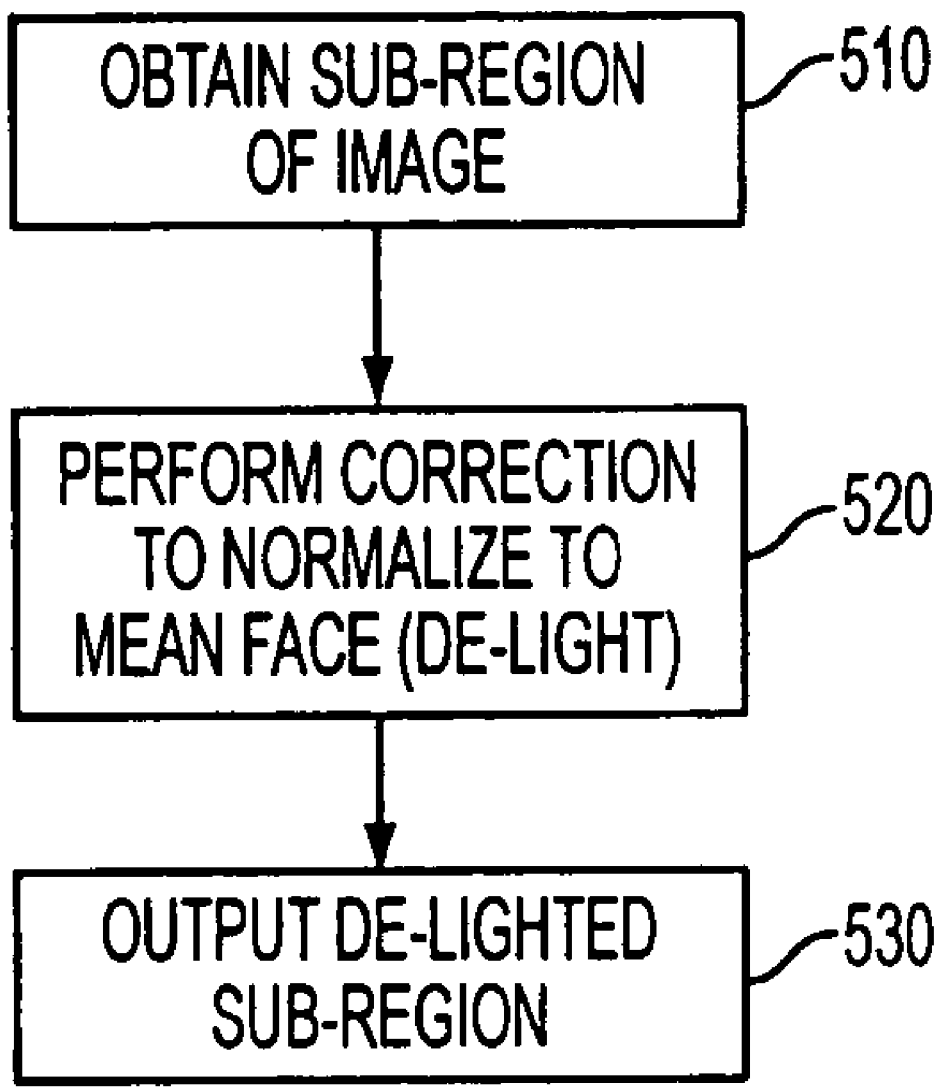
FIG. 5 is a flowchart of a method of de-lighting images according to an aspect of the invention.

According to a further embodiment of the invention shown in FIG. 5, the computer 120 further performs an operation to remove the influence of illumination on the sub-regions of the obtained image and the reference image. As shown in FIG. 5, a sub-region of an image, such as those output in operations 240 or 340, is obtained (operation 510). For each sub-region, the computer 120 (or another computer not shown) performs a correction to normalize the sub-region to a mean face to produce a de-lighted sub-region (operation 520). The de-lighted sub-region is then output (operation 530). According to aspects of the invention, the output de-lighted sub-region is output for use in the process shown in FIG. 4 and/or to be stored in the database 130 according to aspects of the invention. It is understood the process of FIG. 5 can be performed independently of that is FIGS. 2 and 4, and therefore can be used with other image recognition techniques.

According to an aspect of invention process of FIG. 5 is performed by Gamma correction of the sub-region (referred to herein as SadaGama correction). Specifically, since ordinary databases 130 usually include facial images under different illuminations, a sub-region based adaptive Gamma correction is introduced to extract the intrinsic facial images with different illuminations (i.e., de-lighting). While describe in terms of its use with the embodiments of the invention shown in FIGS. 2 through 4 according to an embodiment of the invention, it is understood that the SadaGamma correction can be used with other methods used for facial recognition.

By way of background, there are generally two methods to solve problems caused by illumination. The first method is an analysis by synthesis, whereby facial images are generated under different illuminations for facial recognition. The second method is to normalize the facial image into the same illumination condition, whereby the intrinsic facial images are extracted to maintain the information of different people for use in recognition. While both the first and second methods are useable with the embodiments of the invention shown in FIGS. 2 through 4, the shown embodiment in FIG. 5 utilizes the second method to discard and/or remove the lighting influence effect on face recognition.

According to an aspect of the invention, the SadaGamma correction is used here to adjust the facial images under different illuminations to the same illumination as a mean face 10. The mean face $I_o$ can be any reference image, and preferably a reference image having a desired lighting which provides satisfactory de-lighting results. According to an aspect of the invention, the mean face $I_o$ can be an average face obtained from the internet such as that shown in FIG. 6A, and which is divided into k sub-regions having sub-region mean faces $I^k_o$ as shown in FIG. 6C. Alternately, according to an aspect of the invention, the mean face $I_o$ and mean face sub-regions $I^k_o$ can be calculated using all of or portions of a training set according to equation (7):

$$I_0 = \frac{1}{N} \sum_{x_i \in trainingset} x_i \quad (7)$$

Specifically, a Gamma parameter for each sub-region is selected by minimizing a distance between the pair wise $k^{th}$ sub-region of the original image I and the mean face $I_o$ (i.e. $I^k$ and $I^k_o$) according to equation (8) below:

$$I_{xy}^{k*} = G(I_{xy}^k; \gamma^{k*}) \quad (8)$$

$\gamma^{k*}$ is computed by using equation (9) below:

$$\gamma^{k*} = arg \min_\gamma \sum_{x,y} dis(G(I_{xy}^k; \gamma^k) - I_{0xy}^k) \quad (9)$$

Gamma correction is defined using equation (10) below:

$$G(I_{xy}; \gamma) = c \cdot I_{xy}^{\frac{1}{\gamma}} \quad (10)$$

Figure 7A:
FIGS. 7A and 7B are photographs showing de-lighting of Yale-A database photographic images according to an aspect of the invention.
Figure 7B:
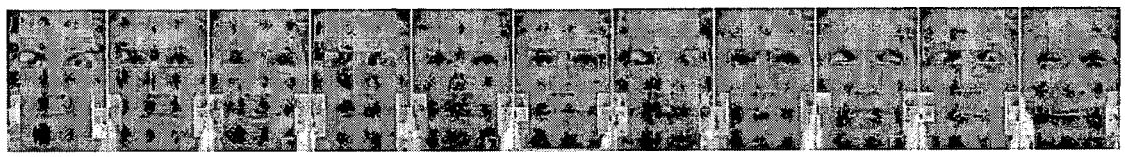
Figure 8A:
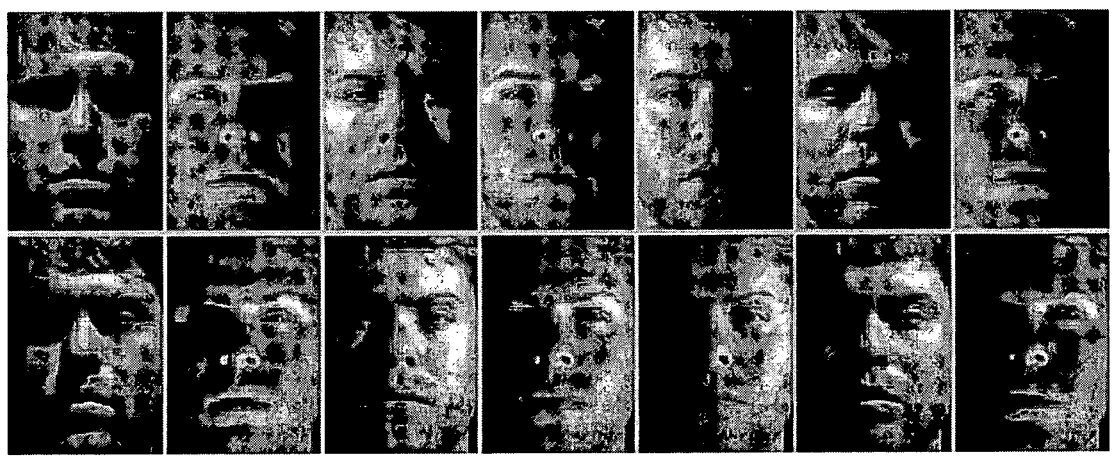
FIGS. 8A through 8C are photographs showing de-lighting of Yale-B database photographic images according to an aspect of the invention.
Figure 8B:
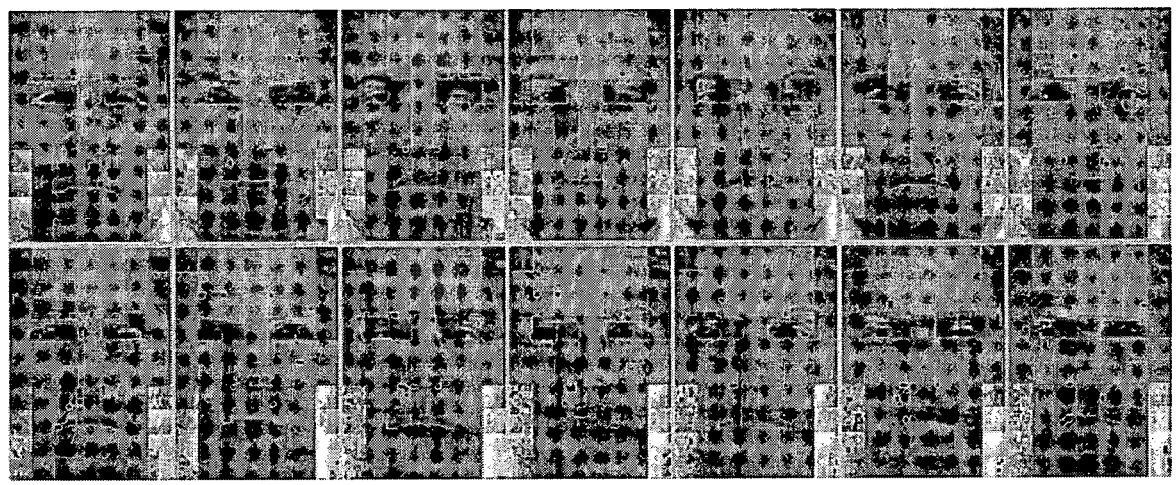

Using equations 8 through 10, a SadaGamma correction was applied to the faces found in the Yale-A and subset 4 of Yale-B databases. The results of the SadaGamma correction are shown in FIGS. 7A through 8B. Specifically, FIG. 7A shows the original faces for the Yale-A database prior to SadaGamma correction, and FIG. 7B shows the corrected faces from the Yale-A database after to SadaGamma correction. FIG. 8A shows the original faces for the subset 4 of the Yale-B database prior to SadaGamma correction, and FIG. 8B shows the corrected faces from the subset 4 of the Yale-B database after to SadaGamma correction. As can be seen in FIGS. 7B and 8B, the influence of illumination has been largely removed.

Figure 8C:
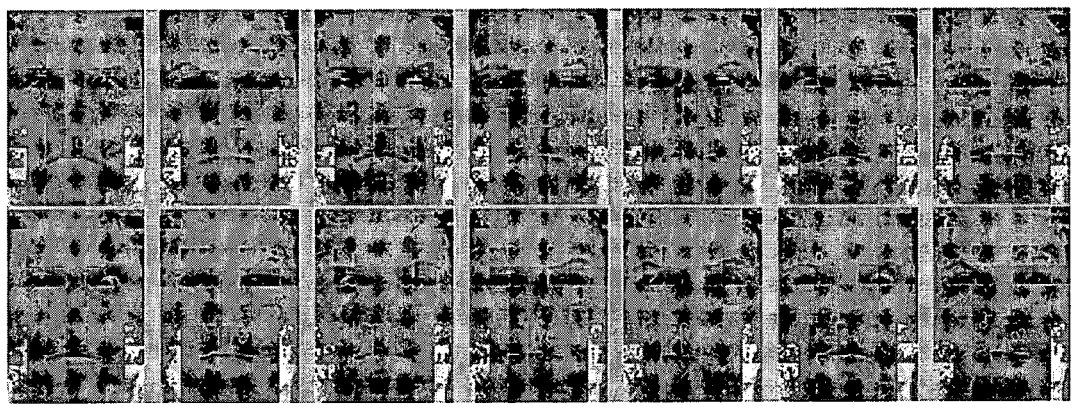

Additionally, it is understood that the de-lighting operation 520 can be performed using a sub-region based histogram equalization (SHE) to de-light the image instead of or in addition to performing adaptive Gamma correction of the sub-regions to provide the de-lighted image for face recognition according to an aspect of the invention. An example of SHE is shown in FIG. 8C in which SHE was used to de-light the Yale-B Subset 4 shown in FIG. 8A. As will be discussed below in relation to Table 2, where SHE is used with MIFE according to an aspect of the invention, a similar result occurs.

FIG. 9 is a conceptual block diagram of a system which performs both the de-lighting shown in FIG. 5 and the MIFE process shown in FIGS. 2 through 4 according to an aspect of the invention. While not required, it is understood that the system of FIG. 9 can be implemented using the embodiment shown in FIG. 1, and/or can be implemented using multiple processors according to aspects of the invention.

As shown, a set of reference images 910 are input and warped/normalized by a normalization unit 920. Specifically, the normalization unit 920 normalizes the reference images 910 according to input landmarks (such as a manually labeled eye and mouth) such that the obtained image's landmarks have a common x-y coordinate to the landmarks of the reference images (such as the reference images shored in the database 130 of FIG. 1). By way of example, where the landmarks include the pupils of the eyes and a center of a mouth, the x-y coordinates of the pupils and the y-coordinate of the mouth for the obtained image are warped to a location corresponding to the pupils and mouth for the reference images so as to facilitate comparison. An example of a warped images is shown in FIGS. 6A and 6B, where FIG. 6A shows an image prior to warping, and FIG. 6B shows an image after warping according to aspects of the invention. However, it is understood that other methods and/or landmarks can be used to obtain a similar result, and that normalization is not required in all aspects of the invention.

A correction unit 930 separates the normalized reference images 910 into sub-regions, and de-lights the normalized reference images 910 using the SadaGamma or SHE process according to an aspect of the invention.

Additionally, one or more test images 950 are input and warped/normalized by a normalization unit 960. Specifically, the normalization unit 960 normalizes the reference images 950 according to input landmarks (such as a manually labeled eye and mouth). A correction unit 970 separates the normalized reference images 950 into sub-regions, and de-lights the normalized reference images 950 using the SadaGamma or SHE process.

The de-lighted images 910, 950 are input to a MIFE processor 980, which subjects the images 910, 950 to the MIFE process as shown in FIG. 2. The MIFE processor 980 outputs a recognized image 990, whereby the image 950 is recognized as one of the reference images 910. It is understood that the embodiment of the invention shown in FIG. 9 can be implemented using the embodiment shown in FIG. 1. Moreover, while shown as separate, it is understood that the normalization units 920 and 960 can be implemented as a single unit (such as through the use of a common display and input device). Additionally, it is understood that the correction units 930 and 970 can be implemented as a single unit such as is shown in FIG. 1, or can be implemented on multiple computers which output corrected images are combined at a common MIFE processor 980.

Graphically, the majority voting procedure and the processes of FIGS. 2 through 5 are shown in FIG. 10. Specifically, an obtained image 1000 is normalized and divided into sub-regions. The divided image 1000 undergoes a SadaGamma correction process such as that shown in FIG. 5 in order to obtain a corrected image 1010. A set of reference images 1020, such as those stored in the database 130 of FIG. 1, are obtained. The set of reference images 1020 is similarly subdivided into sub-regions and subjected to SadaGamma correction to obtained the corrected reference image set 1030 using processes such as those set forth in FIGS. 3 and 5. During testing, the $j^{th}$ of the corrected image 1010 is compared with a corresponding $j^{th}$ region of each of the corrected reference images in the corrected reference image set 1030.

As shown in FIG. 10, the lines originating from the $j^{th}$ sub-region of the corrected image 1010 graphically illustrate the process shown in FIG. 4 according to an aspect of the invention. While shown as a $j^{th}$ sub-region in a top left corner by way of example, it is understood that the shown $j^{th}$ sub-region does not necessarily correspond to a first sub-region being analyzed. It is further understood that a choice of which sub-region is to be analyzed initially can be otherwise chosen. By way of example, a first sub-region to be analyzed according to an aspect of the invention can be a sub-region including one of the landmarks or which is believed to be more reliable in performing the recognition task.

The process is performed for each of the sub-regions of the corrected image 1010 as shown in FIG. 4 according to an aspect of the invention. Once each sub-region of the corrected image 1010 is analyzed, a final result 1040 is produced as graphically shown in FIG. 13. Based on the final result 1040, the computer 120 of FIG. 1 or the MIFE processor 980 of FIG. 9 recognizes which of the reference images 1020 has the most sub-regions in common with the obtained image 1000 so as to recognize the person whose face corresponds to that of the obtained image 1000. In the shown example of FIG. 10, the majority vote method determines that the first reference image 1025, which corresponds to person 1, most closely resembles the obtained image 1000.

While described in terms of a majority, it is understood that the voting need only determine which of the images has the most votes as compared to the remaining images. This voting result is output in order to identify the person or image having the majority, such as occurs in operation 270 in the embodiment of the invention shown in FIG. 2. Therefore, according to an aspect of the invention, each sub-region's decision is calculated by selecting the minimum corresponding sub-region distance between the testing image and the registered images, and the final recognition result is decided by the most frequently appearing decisions of all the sub-regions.

While shown as having each of the sub-regions analyzed according to an aspect of the invention, as the number of sub-regions is known, it is understood that where a sufficient number of sub-regions are associated with a particular person, the recognition analysis can be considered complete without analyzing the remaining sub-regions. By way of example, the number of sub-regions shown in FIG. 10 is 70. As such, once 36 of the sub-regions are determined to be associated with person 1 or where a statistically sufficient number of sub-regions correspond to person 1 such that the remaining persons cannot otherwise achieve a majority vote, operations 250 and 260 can be considered complete and the identify of the person 1 revealed in operation 270. Therefore, according to an aspect of the invention, where the computer 120 or MIFE processor 980 determines that a sufficient number of sub-regions are associated with one person or reference image such that the remaining persons cannot achieve a greater number of votes, operation 270 is performed and the one person or reference image is output.

Figure 11:
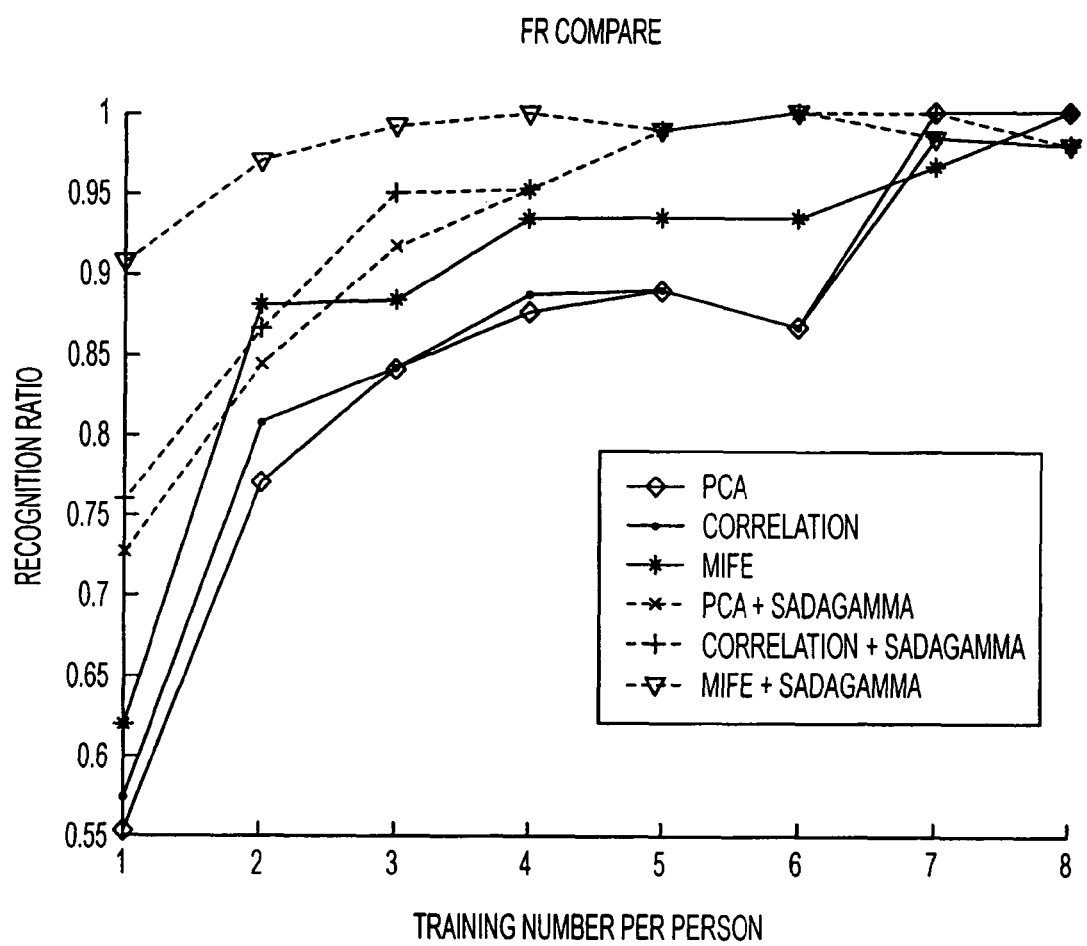
FIG. 11 is a graph showing experimental results of the feature extraction and/or de-lighting as applied to the Yale-A database images according to aspects of the invention.

Using the system of FIG. 9, an experiment was performed based on the Yale-A database according to aspects of the invention. Specifically, the Yale-A database is a face database that includes 15 people under 11 different conditions, such as different expression, illumination and glasses occlusion. The Yale-A database was subjected to a facial recognition experiment using existing techniques, using MIFE according to an aspect of the invention, MIFE with SadaGamma correction according to another aspect of the invention, the conventional principal components analysis (PCA) and correlation methods, and the conventional PCA and correlation methods to which SadaGamma correction was performed according to aspects of the invention. For the correlation method, a direct calculation was made of the Euclidean distance or the normalized Euclidean distance of the original training image and the testing image to find a minimum distance so as to identify the testing image. FIG. 11 shows a result of the experiment using the Yale-A database, which provided both the training and the testing set.

The images used in the experiment have H for height and W for width to make a H*W=90*63=5670 facial image vectors $I_I$ (I=1, 2, ..., N). The face image is divided into different sub-regions with the size of h*w=9*9=81. As such, the dimension feature space D is int(H/h)*int(W/w)=10*7=70.

As can be seen in FIG. 11, when SadaGamma correction is used with the conventional PCA and correlation methods or when the MIFE is used without the SadaGamma correction, the recognition results are improved as compared to results obtained from the PCA or the correlation methods alone. It is also shown that using the SadaGamma correction in addition to MIFE improves the facial recognition results beyond using the MIFE alone or using the SadaGamma correction with the PCA or correlation methods. For instance, it is noted that the combined MIFE and SadaGamma method is also better than the results for the LPP technique reported in Xiaofei He, Shuicheng Yan, Yuxiao Hu, Hong-Jiang Zhang, *Learning a Locality Preserving Subspace for Visual Recognition*, Proceedings of the Ninth IEEE International Conference on Computer Vision, Pages 385-392 (ICCV 2003), the disclosure of which is incorporated by reference and which disclosed the LPP achieving 88.7% recognition when 6 faces per person are used for the training set of images (i.e., in the database 130). In contrast and as shown in FIG. 11, the combined MIFE+SadaGamma techniques achieves 100% recognition when 4 images per person are used for the training set (i.e., in the database 130), and achieves 90.7% recognition when only 1 image per person is used for the training set (i.e., in the database 130). As such, using the MIFE and/or Sada-Gamma techniques for facial recognition requires fewer images of the persons as compared to existing facial techniques.

Additionally, another experiment was performed using the system of FIG. 9 based on the Yale-B database according to an aspect of the invention. The Yale-B database is a face database that includes different pose and illuminations. As described more completely in H. Chen, P. Belhumeur and D. Jacobs. *In Search of Illumination Invariants*, Int. Journal of Computer Vision (referred to herein as "Chen et al."), the disclosure of which is incorporated by reference, the Yale B database includes images of 10 faces (i.e., 10 people) each with 45 different lighting conditions. In the experiment, only the frontal images from the Yale-B database shown in FIGS. 12A through 12D were used. The images used in the experiment have H for height and W for width to make a H*W=5670 facial image vectors $I_i$ (I=1, 2, ..., N). The face image is divided into different sub-regions with the size of 81 to produce a dimension feature space D=70.

Figure 12A:
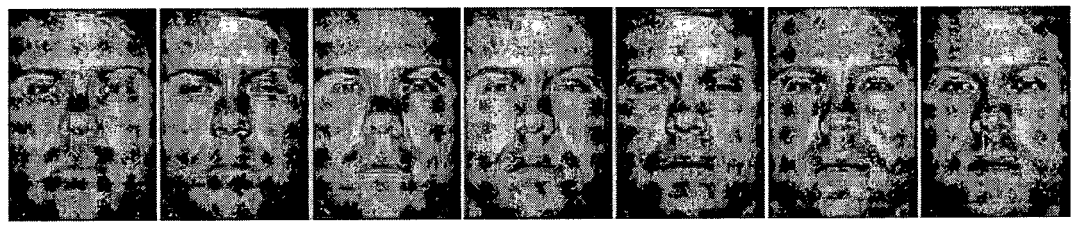
FIGS. 12A through 12D are photographs showing the Yale-B database photographic images for one person which have been normalized according to an aspect of the invention, with FIG. 12A showing a training set of photographic images for the one person and FIGS. 12B through 12D being the testing set of photographic images.
Figure 12B:
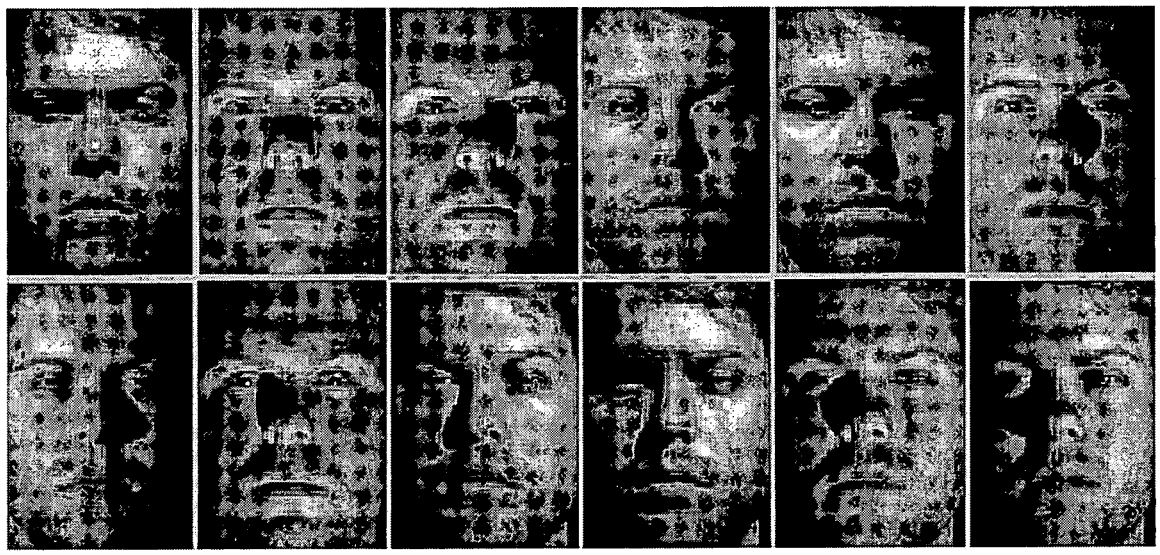
Figure 12C:
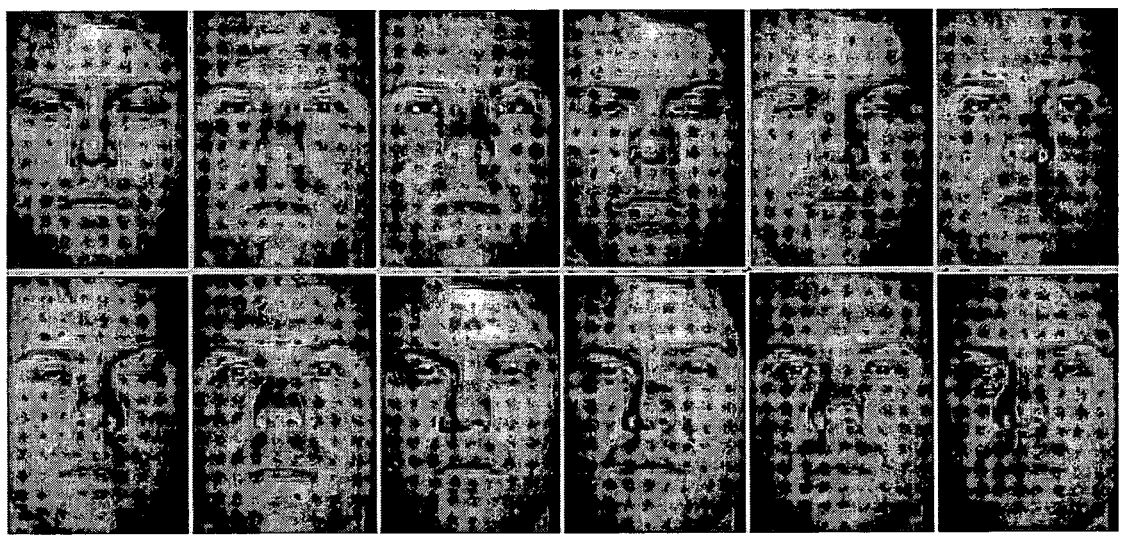
Figure 12D:

The results were grouped into the 4 subsets shown in FIGS. 12A through 12D according to the lighting angle with respect to the frontal axis. The first subset of FIG. 12A covers lighting angles of 0°-12°, the second subset of FIG. 12B covers lighting angles of 12°-25°, the third subset of FIG. 12C covers lighting angles of 25°-50°, and the fourth subset of FIG. 12D covers lighting angles 50°-77°. The subset 1 shown in FIG. 12A is used for training (i.e., as stored in the database, and the subsets 2 through 4 shown in FIGS. 12B through 12D are used for testing (i.e., as obtained images to be identified).

According to the experiment, the methods according to aspects of the present invention were used with the Yale-B database providing both the training and the testing set, and the results compared with the conventional methods, such as those set forth in A. Georghiades, P. N. Belhumeur, and D. Kriegman, From *Few To Many: Generative Models Of Recognizing Faces Under Variable Pose And Illumination*, Proc. Fourth IEEE Int. Conf. on Automatic Face and Gesture Recognition, pp. 277-84 (2000) (referred to herein as "Georghiades et al."), and Shiguang Shan, Wen Gao, Bo Cao, Debin Zhao, *Illumination Normalization for Robust Face Recognition against Varying Lighting Conditions*, IEEE International Workshop on Analysis and Modeling of Faces and Gestures (AMFG), pp 157-164, Nice, France (October 2003) (referred to herein as "Shan et al."), the disclosures of which are incorporated by reference. The results are shown in Table 2.

TABLE 2

| Method | Error Rate (%) | | | |
|---|---|---|---|---|
| | Subset 1 | Subset 2 | Subset 3 | Subset 4 |
| Correlation | 0.0 | 0.0 | 11.7 | 65.0 |
| Eigenfaces | 0.0 | 0.0 | 16.7 | 69.3 |
| Eigenfaces w/o $1^{st}$ 3 | 0.0 | 0.0 | 3.3 | 57.9 |
| ICTCAS's Quotient Illumination Relighting (Shan et al.) | 0.0 | 0.0 | 0.0 | 9.4 |
| PCA + SadaGamma | 0.0 | 0.0 | 0.0 | 9.3 |
| MIFE + SHE | 0.0 | 0.0 | 0.0 | 6.4 |
| MIFE + SadaGamma | 0.0 | 0.0 | 0.0 | 4.3 |
| Gradient Angle (Chen et al.) | 0.0 | 0.0 | 0.0 | 1.4 |
| Cone-Cast (Georghiades et al.) | 0.0 | 0.0 | 0.0 | 0 |

As shown in Table 2, using MIFE, SadaGamma, and/or SHE according to aspects of the invention, the facial recognition results have a lower error rate than the correlation, Eigenfaces, and ICTCAS methods. In Table 2, Eigenfaces refers to a type of PCA in which the PCA is calculated using the eigenvectors and the eigenvalue of the scatter matrix. Further, Eigenfaces without the first three refers to a type of PCA in which the PCA is calculated without the three eigenfaces having the largest eigenvalues.

It is noted that while the Gradient Angle and Cone-Cast methods performed better, the Cone Cast and Gradient Angle methods are based on a point light source a Lambertian assumption and assume the facial image is a rigid object. Thus, the Cone Cast and Gradient Angle methods are difficult to use for a non-rigid object, and are therefore difficult to use for different expressions and occlusions.

In contrast, MIFE+SadaGamma is robust in resolving differences in not only illumination, but also different expression and occlusion as demonstrated by the results of the Yale-A database experiment shown in FIG. 11, which include different expression, illumination as well as occlusion. Furthermore, the combined MIFE+SadaGamma methods according to an aspect of the invention can work with only one image per person for registration as shown in FIG. 11. As such, the method according to an aspect of the present of invention is practical for a chip-based application that provide limited memory. Additionally, the method according to an aspect of the present of invention is practical for identification cards storing information but which have a limited memory, such as a Machine Readable Travel Document (MRTD), which is an international travel document such as a passport or visa containing eye and machine readable data. As such, while shown in FIG. 1 as being part of a larger computer 120. Thus it is understood that the aspects of the present invention shown in FIGS. 2 through 5 can be implemented on a single integrated circuit, chip, MRTD, or other such processor having a limited memory.

In the context of MRTD, the MRTD can use face recognition technology to verify the passport and the person having the passport to determine if the persons are the same. Specifically, each type of MRTD contains, in a standard format, the holder's identification details, including a photograph or digital image, with mandatory identity elements reflected in a two-line machine readable zone (MRZ). Standardization of elements in the travel document allows all participating countries using properly configured readers to read the MRZs of the MRTDs of all other countries issuing the same type of document. Using the recognition methods of the present invention, the photograph or digital image can be compared with the holder of the MRTD to determine a correspondence thereof, and/or can also be compared with a stored database in order to further confirm the identification. Aspects of the present invention can also be applied to other forms of identification, such as drivers licenses, student identification cards, bank cards, membership cards, and other such forms of identification which at least partially rely on physical recognition to verify identity.

According to aspects of the invention, a most informative feature extraction (MIFE) method and system are used to perform face recognition whereby the facial image is separated into different sub-regions for recognition, which allows the extraction of more information than when recognition is attempted with the image as a whole. An efficient and simple majority voting strategy is used to achieve a full facial recognition result based on the results obtained at a sub-region level according to an aspect of the invention.

Furthermore, according to aspects of the invention, when using the most information feature extraction method or other methods, sub-region based adaptive gamma (SadaGamma) correction or histogram equalization (SHE) is very effective for improving the face recognition task under different illuminations. According to an aspect of the invention, using the most information feature extraction method and one of the sub-region based adaptive gamma correction or histogram equalization provides an efficient delighting solution, and achieves a lower error ratio in face recognition with different expression, illumination and occlusion.

According to aspects of the invention, the MIFE process provides a novel, effective and simple sub-region based solution since each image sub-region is treated as a classifier respectively, and majority voting is used to account for each sub-region's individual contribution to the final face recognition task. Additionally, the MIFE process makes a trade-off between the simple Euclidian and complex Geodesic distance, and utilizes classification information otherwise lost in the K-Mean or KNN Euclidian criteria, which lose a lot of useful classification information when the dot product decreases the high dimensional feature or image vector to one-dimensional distance. Also, according to an aspect of the invention, the MIFE process avoids calculating the complex manifold and Geodesic distance that need a lot of training samples. Furthermore, according to an aspect of the invention, the SadaGamma correction is used for delighting (i.e. to correct the face recognition under different illuminations to the same illuminations but maintain the personal information) and to otherwise extract the intrinsic images and then use the MIFE process for face recognition. Lastly, the combined MIFE and SadaGamma process is robust toward resolving different facial expressions, illumination and occlusion so as to provide a final facial identification.

While described in terms of facial recognition for the identification of persons based on stored images, it is understood that the present invention can be used to identify persons based on images of other body parts, identify animals, plants, or other non-rigid shapes for which identification is sought based on obtained and stored images. Moreover, it is understood that the present invention could be used to identify objects having rigid surfaces, such as might be used to identify items in an inventory or to match lost and recovered items (such as cars), and is not limited to finding correlations between obtained and stored images of non-rigid surfaces.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system for performing image recognition, the system comprising:
    an image input device which inputs a first image;
    a database having a set of reference images; and
    a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions.

2. The system of claim 1, wherein the first image is of a non-rigid surface, the non-rigid surface comprises a surface on a body element, and the body element is a face.

3. A system for performing image recognition, the system comprising:
    an image input device which inputs a first image;
    a database having a set of reference images; and
    a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions,
    wherein the comparison unit, after each comparison of the first and corresponding reference image sub-regions, stores an identification of which of the reference images has the sub-region with a greatest correspondence with the first image sub-region, and after a predetermined number of the first and reference image sub-regions have been compared, reviews the stored identifications to determine which of the reference images has a greatest number of reference image sub-regions corresponding to the first image sub-regions in order to determine which of the reference images has the greatest correlation to the first image.

4. The system of claim 3, wherein the predetermined number of the first and reference image sub-regions comprises a total number of the first image sub-regions.

5. The system of claim 3, wherein the predetermined number of the first and reference image sub-regions is less than a total number of the first image sub-regions.

6. The system of claim 3, wherein the predetermined number of the first and reference image sub-regions is a number of sub-regions at which, based on comparisons of the first and reference image sub-regions made at the predetermined number, one of the reference images is determined to have the greatest correlation if it is a statistical impossibility for another of the reference images to have the greatest correlation to the first image.

7. A system for performing image recognition, the system comprising:
    an image input device which inputs a first image;
    a database having a set of reference images; and
    a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions,
    wherein each of the first image sub-regions has a height h and a width w, the first image has a height H and a width W, and a number of first image sub-regions is int(H/h)*int(W/w).

8. The system of claim 7, wherein a size of each of the first image sub-regions is determined experimentally.

9. A system for performing image recognition, the system comprising:
    an image input device which inputs a first image;
    a database having a set of reference images; and
    a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions,
    wherein the comparison unit compares the first and reference images sub-regions by, for a $j^{th}$ image sub-region of the first image and the reference images, calculating a label I for the $j^{th}$ sub-region as $$\underset{l(x_{jk})}{\operatorname{argmin}} \, dis(z_{jx} - x_{jk}), k = 1 \sim N, j = 1 \sim D$$

and determining a D dimensional decision matrix $Y=[y'_1, y'_2, \ldots y'_D]$ as $$y'_{ji} = \begin{cases} 1, \text{ for } i = l \\ 0, \text{ for } i \neq l \end{cases}$$

$z_{jx}$ is the $j^{th}$ image sub-region of the first image,
$x_{jk}$ is the $j^{th}$ image sub-region of the reference images,
D is a number of sub-regions, and
N is a number of reference images.

10. A system for performing image recognition, the system comprising:
    an image input device which inputs a first image;
    a database having a set of reference images;
    a comparison unit which receives the first image having been divided into first image sub-regions, compares the first image sub-regions with corresponding reference image sub-regions of the reference images, and determines based on the comparison which of the reference images has a greatest correlation to the first image based on the comparisons between the reference image sub-regions and the first image sub-regions; and
    a correction unit which compares each of the first image sub-regions with a mean for the corresponding first image sub-region to remove an influence of illumination and/or occlusion in each of the first image sub-regions to produce a corrected first image, wherein the comparison unit compares the corrected first image sub-regions with the reference image sub-regions to determine which of the reference images has the greatest correlation,
    wherein:

the mean comprises an average value for a representative number of each reference image sub-region calculated as follows:

$$\frac{1}{N} \sum_{x_i \in trainingset} x_i,$$

N is a number of images of the training set, and
the training set comprises ones of the reference images.

11. A system for performing image recognition, the system comprising:
an image input device which inputs a first image;
a database having a set of reference images; and
a correction unit which receives the first image having been divided into first image sub-regions, compares each of the first image sub-regions with a mean for the corresponding first image sub-region to respectively remove an influence of illumination and/or occlusion in each of the first image sub-regions to produce corrected first image sub-regions, and produces a corrected first image based on the corrected first image sub-regions.

12. The system of claim 11, wherein the correction unit further performs an adaptive gamma correction for each of the first image sub-regions in order to provide the corrected first image sub-regions.

13. The system of claim 11, wherein the image input device is a camera which inputs the first image to the comparison unit.

14. The system of claim 11, wherein the image input device is a scanner which digitizes the first image and inputs the first image to the comparison unit.

15. The system of claim 11, wherein the image input device is a memory reader which receives a memory which stores the first image and inputs the first image read from the memory to the comparison unit.

16. The system of claim 11, further comprising a writing unit which records the corrected first image on a storage medium as part of a database of corrected images.

17. The system of claim 11, further comprising a correlation system comprising:
a database having a set of reference images; and
a comparison unit which receives the corrected first image from the correction unit, independently compares the first image sub-regions with corresponding sub-regions of the reference images, respectively, and determines based on the comparison which of the reference images has a greatest correlation to the first image based on the comparisons.

18. The system of claim 17, wherein in order to determine the greatest correlation, the comparison unit performs one of a Principal Components Analysis (PCA), a Linear Discriminant Analysis (LDA), and a correlation method.

19. A system for performing image recognition, the system comprising:
an image input device which inputs a first image;
a database having a set of reference images; and
a correction unit which receives the first image having been divided into first image sub-regions, compares each of the first image sub-regions with a mean for the corresponding first image sub-region to remove an influence of illumination and/or occlusion in each of the first image sub-regions to produce corrected first image sub-regions, and produces a corrected first image based on the corrected first image sub-regions,
wherein:

the correction unit
selects a Gamma parameter for each of the first image sub-regions by minimizing a distance between a pair wise $k^{th}$ first image sub-region and $k^{th}$ sub-region of a mean image as follows, $$I_{xy'}^{k'} = G(I_{xy}^{k}; \gamma^{k*}),$$

computes $\gamma^{k*}$ as follows, $$\gamma^{k*} = arg\ \min_{\gamma} \sum_{x,y} dis(G(I_{xy}^{k}; \gamma^{k}) - I_{0xy}^{k}), \text{ and}$$

performs Gamma correction as follows:

$$G(I_{xy}; \gamma) = c \cdot I_{xy}^{\frac{1}{\gamma}},$$

$I^k$ is the $k^{th}$ first image sub-region of the first image,
$I_o^k$ is the $k^{th}$ sub-region of the mean image,
I is the first image,
$I_o$ is the mean image, and
c is a constant.

20. The system of claim 19, wherein:
the mean image comprises an average value for a representative number of each reference image sub-region calculated as follows:

$$\frac{1}{N} \sum_{x_i \in trainingset} x_i,$$

and
N is a number of images of the training set of reference images.

21. A method of determining a correspondence between an obtained image divided into obtained image sub-regions and a set of reference images divided into corresponding reference image sub-regions, comprising:
determining a greatest correlation between one of the obtained image sub-regions and corresponding sub-regions for the reference images through independent respective sub-region comparisons;
determining another greatest correlation between another one of the obtained image sub-regions and corresponding sub-regions for the reference images through independent respective sub-region comparisons; and
selecting one of the reference images based upon the one and another greatest correlations.

22. The method of claim 21, further comprising determining the remaining greatest correlations between the remaining ones of the obtained image sub-regions and the corresponding remaining reference image sub-regions, wherein the selecting comprises determining which one of the reference images is most frequently determined to have the greatest correlation for the obtained image sub-regions.

23. At least one computer readable medium encoded with processing instructions for implementing a method of 21 performed by at least one computer.

24. A method of removing an influence of illumination and/or occlusions of an obtained image, comprising:

for each respective sub-region of an obtained image, determining a sub-region factor which minimizes a difference between the sub-region and a mean for the sub-region; and applying the sub-region factor to the corresponding sub-region for each of the sub-regions such that the entire obtained image is corrected.

25. The method of claim 24, wherein the factor comprises an adaptive gamma correction which minimizes a difference between the corresponding sub-region and the mean associated with the sub-region.

26. The method of claim 24, further comprising storing the corrected obtained image.

27. The method of claim 24, further comprising using the corrected obtained image to determine a correlation between the corrected obtained image and another image.

28. The method of claim 27, wherein the using the corrected obtained image further comprises:
determining a correlation between one of the sub-regions of the corrected obtained image and corresponding sub-regions for reference images through independent respective sub-region comparisons;
determining another correlation between another one of the corrected obtained sub-regions and corresponding sub-regions for the reference images through independent respective sub-region comparisons; and
determining an overall correspondence between the corrected obtained image and the another image based upon the one and another correlations.

29. The method of claim 24, further wherein the using the corrected obtained image to determine the correlation comprises using a Principal Components Analysis.

30. The method of claim 24, further wherein the using the corrected obtained image to determine the correlation comprises using a Linear Discriminant Analysis.

31. At least one computer readable medium encoded with processing instructions for implementing a method of 24 performed by at least one computer.

32. A system for performing image recognition, the system comprising:
an image input device which inputs a first image;
a database having a set of reference images; and
a comparison unit which receives the first image having been divided into first image sub-regions, independently compares the first image sub-regions with corresponding reference image sub-regions of the reference images, respectively, and determines based on the comparison which of the reference images has a greatest correlation to the first image based on the comparisons between the reference image sub-regions and the first image sub-regions.

33. The system of claim 32, wherein:
for each of i=1 to D, the comparison unit compares an $i^{th}$ first image sub-region with a corresponding $i^{th}$ reference image sub-region of each of the reference images, and determines which of the reference images includes the $i^{th}$ reference image sub-region having a greatest correspondence to the $i^{th}$ first image sub-region, and
D is a number of first image sub-regions.

34. The system of claim 32, further comprising a correction unit which compares each of the first image sub-regions with a mean for the corresponding first image sub-region to remove an influence of illumination and/or occlusion in each of the first image sub-regions to produce a corrected first image, wherein the comparison unit compares the corrected first image sub-regions with the reference image sub-regions to determine which of the reference images has the greatest correlation.

35. The system of claim 34, wherein the comparison unit and the correction unit comprises a processor.

36. The system of claim 34, wherein the comparison unit comprises a first processor and the correction unit comprise a second processor other than the first processor.

37. The system of claim 34, wherein the comparison unit further stores the first image having the first image sub-regions in the database.

38. The system of claim 34, further comprising a correction unit which compares each of the reference image sub-regions with the mean for the corresponding reference image sub-region to remove an influence of illumination and/or occlusion in each of the reference image sub-regions to produce corrected reference images, wherein the comparison unit compares the corrected first image sub-regions with the corrected reference image sub-regions to determine which of the reference images has the greatest correlation.

39. The system of claim 38, wherein the processor further performs a histogram equalization for each of the first image sub-regions to provide the corrected first image sub-regions.

40. The system of claim 34, wherein the database stores corrected reference images in which each of the reference image sub-regions has been compared with the mean for the corresponding reference image sub-region to remove an influence of illumination and/or occlusion in each of the reference image sub-regions, wherein the comparison unit compares the corrected first image sub-regions with the corrected reference image sub-regions to determine which of the reference images has the greatest correlation.

41. The system of claim 32, wherein the image input device is a camera which inputs the first image to the comparison unit.

42. The system of claim 32, wherein the image input device is a scanner which digitizes the first image and inputs the first image to the comparison unit.

43. The system of claim 32, wherein the image input device is a memory reader which receives a memory storing the first image and inputs the first image read from the memory to the comparison unit.

44. The system of claim 43, wherein the memory is included in an identification card.

45. The system of claim 44, wherein the identification card comprises a travel document card.

46. The system of claim 32, wherein the comparison unit comprises a processor which compares the first image sub-regions with corresponding reference image sub-regions of the reference images, and determines based on the comparison which of the reference images has the greatest correlation to the first image based on the comparisons between the reference image sub-regions and the first image sub-regions.

47. The system of claim 32, wherein the comparison unit comprises processors, where each of the processors compares at least one of the first image sub-regions with corresponding reference image sub-regions of the reference images, and determines based on the comparison which of the reference images has the greatest correlation to the first image based on the comparisons between the reference image sub-regions and the first image sub-regions.

48. The system of claim 32, wherein the database comprises a storage medium disposed in a computer having the comparison unit.

49. The system of claim 32, wherein the database comprises a storage medium disposed in a computer other than a computer having the comparison unit.

50. The system of claim 32, wherein the first image is of a non-rigid surface.

51. The system of claim 50, wherein the non-rigid surface comprises a surface on a body element.

52. The system of claim 32, wherein the comparison unit outputs identification information for the reference image having the greatest correlation.

53. The system of claim 52, wherein the identification information comprises a name of a person in the reference image.

54. The system of claim 32, further comprising a feature identification unit which identifies at least one predetermined feature of the first image so as to normalize the first image as compared to the reference images, wherein the comparison unit receives the normalized first image having been divided into first image sub-regions.

55. The system of claim 32, wherein the first image is of a non-rigid surface, the non-rigid surface comprises a surface on a body element, and the body element is a face.

* * * * *